US007203374B2

(12) United States Patent
Hatabu

(10) Patent No.: US 7,203,374 B2
(45) Date of Patent: Apr. 10, 2007

(54) TWO-DIMENSIONAL ORTHOGONAL TRANSFORMATION AND QUANTIZATION METHOD AND ITS DEVICE AND PROGRAM

(75) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 832 days.

(21) Appl. No.: 10/335,856

(22) Filed: Jan. 3, 2003

(65) Prior Publication Data

US 2003/0128887 A1 Jul. 10, 2003

(30) Foreign Application Priority Data

Jan. 10, 2002 (JP) ............................. 2002-003152

(51) Int. Cl.
*G06K 9/36* (2006.01)
*G06K 9/46* (2006.01)

(52) U.S. Cl. ...................................... 382/248; 382/277
(58) Field of Classification Search ................ 382/239, 382/248, 250, 251, 277
See application file for complete search history.

(56) References Cited

U.S. PATENT DOCUMENTS 4,394,774 A * 7/1983 Widergren et al. ......... 382/250
5,086,488 A * 2/1992 Kato et al. .................. 382/239

2001/0026642 A1 10/2001 Kang et al.

FOREIGN PATENT DOCUMENTS

| JP | 3-85871 A | 4/1991 |
|---|---|---|
| JP | 6-70175 A | 3/1994 |
| JP | 10-173759 A | 6/1998 |
| JP | 2001-196935 A | 7/2001 |
| KR | 10-0237885 B1 | 10/1999 |

* cited by examiner

*Primary Examiner*—Phuoc Tran
(74) *Attorney, Agent, or Firm*—Sughrue Mion, PLLC

(57) ABSTRACT

In a process of resolving the two-dimensional orthogonal transformation into the one-dimension orthogonal transformations in a horizontal direction and a vertical direction, with respect to each signal vector within the block memory to be orthogonal-transformed in a vertical direction orthogonal transforming unit after having been orthogonal-transformed in a horizontal direction orthogonal transforming unit, a power calculating unit calculates the power of each signal vector, a threshold obtaining unit requires a threshold enabling the quantized coefficient signal to take a value other than zero, and a value comparing unit compares the both powers. When the power calculated by the power calculating unit is below the threshold, the vertical-directional orthogonal transformation and quantization processing as for the corresponding signal vector is omitted and a zero coefficient vector generating unit generates the quantized coefficient signal vector simply consisting of zero and supplies it as the calculation result.

36 Claims, 7 Drawing Sheets

TWO-DIMENSIONAL ORTHOGONAL TRANSFORMATION AND QUANTIZATION METHOD AND ITS DEVICE AND PROGRAM

BACKGROUNDS OF THE INVENTION

1. Field of the Invention

The present invention relates to digital still image coding or digital moving image coding, and more particularly to a two-dimensional orthogonal transformation and quantization method and its device.

2. Description of the Related Art

Recently, as a method of digital still image coding and digital moving image coding, a coding method in combination with two techniques of transform coding and quantization is in a widespread use, and there arises a strong demand for a method of realizing the two-dimensional orthogonal transformation and quantization, that is the most important part of the above coding, at a higher speed and with a lower power consumption.

As an example of the still image coding for use on the transform coding and quantization, there is the JPEG standard recommended by JPEG (Joint Photographic Expert Group) of ISO (International Organization for Standardization) and CCITT (Consulting Committee of International Telegraph and Telephone) (at present, ITU-T (International Telecommunication Union-Telecommunication Standardization Sector)).

In the method, an input image is divided into rectangular regions, the two-dimensional orthogonal transformation and quantization is performed on each divided pixel block, and the obtained coefficient block is coded into a bit vector. For the orthogonal transformation, the transformation having the characteristic of resolving into frequency components is used and especially the discrete cosine transformation is often used. Generally, since the adjacent pixels have correlation in an image called a natural image, it is possible to reduce the redundancy of the signal information by concentrating the signal power on a low frequency component, through the orthogonal transformation such as the discrete cosine transformation. Further, by combining the above with the quantization using the man's visual characteristic such that a man is sensitive to a change in the low frequency component but insensitive to a change in the high frequency component, efficient compact coding which can restrain the image deterioration caused by compression becomes possible.

FIG. 2 shows the structure of the still image compact encoder according to this coding method. In FIG. 2, the reference numeral 201 indicates a blocking unit for dividing an input image into the rectangular blocks of predetermined size, the reference numeral 202 indicates a two-dimensional orthogonal transforming unit for performing the two-dimensional orthogonal transformation on each pixel block entered by the blocking unit 201, the reference numeral 203 indicates a quantizing unit for quantizing a transform coefficient supplied from the two-dimensional orthogonal transforming unit 202, and the reference numeral 204 indicates a variable length coding unit for coding the coefficient block supplied from the quantizing unit 203 into a bit vector. The portion surrounded by a dotted line indicates the portion for the two-dimensional orthogonal transformation and quantization processing.

As a typical example of the moving image compact coding using the transform coding and quantization, there are the MPEG-1, MPEG-2, MPEG-4 methods recommended by MPEG (Moving Picture Expert Group) of ISO. These methods perform the inter-frame prediction of predicting an image to be coded based on the prior-frame and the post-frame and the coding in combination with the transform coding of a prediction-error signal. FIG. 3 shows the structure of the moving image compact encoder according to this method. In FIG. 3, the reference numeral 301 indicates a frame scanning unit for replacing input frames in a proper sequence, the reference numeral 302 indicates a blocking unit for dividing a frame entered from the frame scanning unit 301 into rectangular blocks of predetermined size, the reference numeral 303 indicates a frame memory for storing the decoded image of a coded frame as a reference frame for prediction, the reference numeral 304 indicates an inter-frame predicting unit for generating a predicted image by performing an inter-frame prediction according to the input image block signal and the decoded image within the frame memory 303, the reference numeral 305 indicates a prediction-error calculating unit for calculating a prediction error according to the input image block and the predicted image, the reference numeral 306 indicates a two-dimensional orthogonal transforming unit for performing the two-dimensional orthogonal transformation on a prediction error, the reference numeral 307 indicates a quantizing unit for quantizing an orthogonal transform coefficient, the reference numeral 308 indicates a variable length coding unit for coding a quantized coefficient and an inter-frame prediction parameter into a bit vector, the reference numeral 309 indicates an inverse quantizing unit for inverse-quantizing a quantized coefficient, the reference numeral 310 indicates an inverse two-dimensional orthogonal transforming unit for performing an inverse transformation to the two-dimensional orthogonal transformation on an inverse quantized coefficient, and the reference numeral 311 indicates a decoded image calculating unit for calculating a decoded image from the sum of the inverse transformation signal and the predicted image and storing the decoded image into the frame memory 303. The portion surrounded by a dotted line indicates the two-dimensional orthogonal transformation and quantization processing unit.

As mentioned above, the quantization and orthogonal transformation of a two-dimensional image signal plays an important role in both the still image compact coding and the moving image compact coding. However, since the orthogonal transformation and quantization processing generally requires a great deal of multiplication and division calculation, an increase in the processing time and the power consumption owing to the above becomes a big problem. Therefore, there arises a strong demand for a calculation method capable of reducing the calculation amount required for the two-dimensional orthogonal transformation and quantization processing.

The conventional technique for high speed processing by reducing the calculation amount of the two-dimensional orthogonal transformation and quantization introduces a calculation-amount reducing technique especially about the two-dimensional discrete cosine transformation and quantization.

A lot of studies have been performed on the method of calculating the two-dimensional transformation at a high speed, since a long time ago. These studies are classified into the following two types roughly. The first is a method of adopting a high speed method of one-dimensional orthogonal transformation, by returning the two-dimensional orthogonal transformation to the repetition of the one-dimensional orthogonal transformation according to the matrix resolution. The second is a method of reducing the number of the multiplication and division times, without performing the matrix resolution, like the two-dimensional discrete cosine high speed calculation method as disclosed in Japanese Patent Publication Laid-Open (Kokai) No. Heisei 8-335885.

A lot of studies have been performed also on a method of calculating quantization at a high speed. In these days, most often adopted is a method of reducing the number of the burdensome multiplication and division times, by using the characteristic such that a quantization signal of the high frequency component concentrates on zero in compact coding of a natural image, as disclosed in Japanese Patent Publication Laid-Open (Kokai) No. Heisei 03-085871.

However, there is a consistently strong demand for speeding up and saving the power consumption in the two-dimensional orthogonal transformation and quantization processing.

SUMMARY OF THE INVENTION

An object of the present invention is to provide a method of performing the two-dimensional orthogonal transformation and quantization with less calculation amount than the conventional technique, thereby realizing a higher speed and a lower power consumption than the conventional technique.

According to the first aspect of the invention, a method of performing a two-dimensional orthogonal transformation and quantization on an input pixel block, comprising the following step in which with one of a horizontal direction and a vertical direction fixed as a first direction and the other fixed as a second direction, in a process of resolving the two-dimensional orthogonal transformation into one-dimensional orthogonal transformations in the first direction and the second direction, with respect to each signal vector to be orthogonal-transformed in the second direction after having been orthogonal-transformed in the first direction, when a power value obtained by calculating a power of the signal vector is below a threshold enabling at least one of quantized coefficient signals to take a value other than zero, the second-directional orthogonal transformation and quantization processing as for the corresponding signal vector is omitted and a quantized coefficient signal vector simply consisting of zeros is supplied as a calculation result.

According to the second aspect of the invention, a method of performing a two-dimensional orthogonal transformation and quantization on an input pixel block, comprising the following steps of with one of a horizontal direction and a vertical direction fixed as a first direction and the other fixed as a second direction, a) applying a one-dimensional orthogonal transform to the input pixel block in the first direction and storing the obtained coefficient signal block into a memory, and b) with respect to at least one of second-directional signal vectors constituting the coefficient signal block stored in the memory, calculating a power of the signal vector as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all quantized coefficients of zero, and otherwise, generating a quantized coefficient vector by quantizing the coefficient signal vector obtained through the one-dimensional orthogonal transformation of the corresponding signal vector in the second direction, according to the quantization characteristic.

In the preferred construction, the method of performing the two-dimensional orthogonal transformation and quantization further comprises the following step of c) with respect to the signal vector not targeted for the processing in Step b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

In another preferred construction, the two-dimensional orthogonal transformation is a two-dimensional discrete cosine transformation, the one-dimensional orthogonal transformation in the first direction is a one-dimensional discrete cosine transformation in the first direction, the one-dimensional orthogonal transformation in the second direction is a one-dimensional discrete cosine transformation in the second direction, and the signal vector targeted for the processing in Step b) is one or a plurality of the signal vectors corresponding to transform coefficients whose order in the one-dimensional discrete cosine transformation in the first direction is no less than a predetermined number.

According to another aspect of the invention, a method of performing a two-dimensional orthogonal transformation and quantization on an input pixel block, comprising the following steps of with one of a horizontal direction and a vertical direction fixed as a first direction and the other fixed as a second direction, a) applying a one-dimensional orthogonal transform to the input pixel block in the first direction and storing the obtained coefficient signal block into a memory, and b) repeating processing of, with respect to second-directional signal vectors of the coefficient signal block stored in the memory, calculating each power of the signal vectors, starting from the signal vector having the highest possibility, in order of decreasing such a possibility that all coefficients in the signal vector are quantized to zeros, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing of a predetermined number of signal vectors.

In the preferred construction, the method of performing the two-dimensional orthogonal transformation and quantization further comprises the following step of c) with respect to the signal vector not targeted for the processing in Step b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

In another preferred construction, the two-dimensional orthogonal transformation is a two-dimensional discrete cosine transformation, the one-dimensional orthogonal transformation in the first direction is a one-dimensional discrete cosine transformation in the first direction, the one-dimensional orthogonal transformation in the second direction is a one-dimensional discrete cosine transformation in the second direction, and in Step b), a sequence of decreasing an order of the one-dimensional discrete cosine transformation in the first direction is adopted as the order of decreasing the possibility such that all the quantized coefficients become zero as for the signal vectors.

According to another aspect of the invention, a method of performing a two-dimensional orthogonal transformation and quantization on an input pixel block, comprising the following steps of with one of a horizontal direction and a vertical direction fixed as a first direction and the other fixed as a second direction, a) applying a one-dimensional orthogonal transform to the input pixel block in the first direction and storing the obtained coefficient signal block into a memory, and b) repeating processing of, with respect to second-directional signal vectors of the coefficient signal block stored in the memory, calculating each power of the signal vectors, starting from the signal vector having the highest possibility, in order of decreasing such a possibility that all coefficients in the signal vector are quantized to zeros, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing for the first signal vector having the power not below the minimum possible power to be taken by any two-dimensional orthogonal transform coefficient, quantized to a value other than zero, in the signal string through quantization according to the predetermined quantization characteristic.

According to another aspect of the invention, a method of performing a two-dimensional orthogonal transformation and quantization on an input pixel block, comprising the following steps of with one of a horizontal direction and a vertical direction fixed as a first direction and the other fixed as a second direction, a) applying a one-dimensional orthogonal transform to the input pixel block in the first direction and storing the obtained coefficient signal block into a memory, and b) repeating processing of, with respect to second-directional signal vectors of the coefficient signal block stored in the memory, calculating each power of the signal vectors, starting from the signal vector having the highest possibility, in order of decreasing such a possibility that all coefficients in the signal vector are quantized to zeros, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing for a predetermined number of signal vectors, or if not finishing, until finishing processing for the first signal vector having the power not below the minimum possible power to be taken by any two-dimensional orthogonal transform coefficient, quantized to a value other than zero, in the signal vector through quantization according to the predetermined quantization characteristic.

According to another aspect of the invention, a device for performing a two-dimensional orthogonal transformation and quantization on an input pixel block, comprises first direction orthogonal transforming means for applying a one-dimensional orthogonal transformation to an input pixel block in a first direction, with one of a horizontal direction and a vertical direction fixed as the first direction and the other fixed as a second direction, a memory for storing a coefficient signal block supplied by the first direction orthogonal transforming means, signal vector transmitting means for taking out a second-directional signal vector from the memory, second direction orthogonal transforming means for one-dimensionally orthogonal-transforming the signal vector transmitted from the signal vector transmitting means, in the second direction, quantizing means for quantizing a coefficient signal vector that is an output of the second direction orthogonal transforming means, according to a predetermined quantization characteristic, threshold obtaining means for calculating a minimum possible power to be taken by any two-dimensional orthogonal transform coefficient, quantized to a value other than zero, in the signal vector through quantization according to the quantization characteristic, by the unit of signal vector in the second direction, power calculating means for calculating the power of the signal vector transmitted from the signal vector transmitting means, value comparing means for checking whether the calculated power by the power calculating means is below the threshold calculated by the threshold obtaining means, zero coefficient vector generating means for generating a second directional signal vector consisting of all quantized coefficients of zero, quantized coefficient selection output means for selecting one of the outputs of the quantizing means and the zero coefficient vector generating means in every second-directional signal vector, as an output coefficient signal after quantization, and controlling means for controlling as follows:

a) with respect to at least one of the second directional signal vectors of the coefficient signal block stored in the memory, the signal vector transmitting means to take out the signal vector, the power calculating means to calculate the power thereof, the threshold obtaining means to calculate the threshold power corresponding to the signal vector, the value comparing means to compare the both powers; when the calculated power is below the threshold power, the zero coefficient vector generating means to generate such a quantized coefficient vector that all the quantized coefficients become zero as for the corresponding signal vector, the quantized coefficient vector selection output means to select the zero coefficient vector, while when the calculated power is not below the threshold power, the second direction orthogonal transforming means to apply one-dimensional orthogonal transform to the corresponding signal vector in the second direction, the quantizing means to quantize the obtained coefficient signal vector according to the quantization characteristic, so to generate a quantized coefficient vector, and the quantized coefficient selection output means to select the corresponding quantized coefficient vector.

In the preferred construction, aid controlling means further controls as follows b) with respect to the signal vector not targeted for the processing, of the second-directional signal vectors of the coefficient signal block stored in the memory, the signal vector transmitting means to take out the signal vector, the second direction orthogonal transforming means to apply one-dimensional orthogonal transform to the signal vector in the second direction, the quantizing means to quantize the obtained coefficient signal vector according to the quantization characteristic, and the quantized coefficient selection output means to select the corresponding coefficient signal vector.

In another preferred construction, the two-dimensional orthogonal transformation is a two-dimensional discrete cosine transformation, the one-dimensional orthogonal transformation in the first direction is a one-dimensional discrete cosine transformation in the first direction, the one-dimensional orthogonal transformation in the second direction is a one-dimensional discrete cosine transformation in the second direction, and at least one of the second-directional signal vectors of the coefficient signal block stored in the memory is one or a plurality of the signal vectors corresponding to transform coefficients whose order in the one-dimensional discrete cosine transformation in the first direction is no less than a predetermined number.

According to another aspect of the invention, a device for performing a two-dimensional orthogonal transformation and quantization on an input pixel block, comprises first direction orthogonal transforming means for applying a one-dimensional orthogonal transformation to the input pixel block in a first direction, with one of a horizontal direction and a vertical direction fixed as the first direction and the other fixed as a second direction, a memory for storing a coefficient signal block supplied by the first direction orthogonal transforming means, signal vector transmitting means for taking out a second-directional signal vector from the memory, second direction orthogonal transforming means for one-dimensionally orthogonal-transforming the signal vector transmitted from the signal vector transmitting means, in the second direction, quantizing means for quantizing a coefficient signal vector that is an output of the second direction orthogonal transforming means, according to a predetermined quantization characteristic, threshold obtaining means for calculating a minimum possible power to be taken by any two-dimensional orthogonal transform coefficient, quantized to a value other than zero, in the signal vector through quantization according to the quantization characteristic, by the unit of signal vector in the second direction, power calculating means for calculating the power of the signal vector transmitted from the signal vector transmitting means, value comparing means for checking whether the calculated power by the power calculating means is below a threshold calculated by the threshold obtaining means, zero coefficient vector generating means for generating a second-directional signal vector consisting of all quantized coefficients of zero, quantized coefficient selection output means for selecting one of the outputs of the quantizing means and the zero coefficient vector generating means in every second-directional signal vector, as an output coefficient signal after quantization, and controlling means for repeating the following processing a of a) with respect to the second-directional signal vectors of the coefficient signal block stored in the memory, controlling the signal vector transmitting means to take out each signal vector, starting from the signal vector having the highest possibility, in order of decreasing such a possibility that all the coefficients in the signal vector are quantized to zeros, controlling the power calculating means to calculate the power thereof, controlling the threshold obtaining means to calculate the threshold power corresponding to the signal vector, controlling the value comparing means to compare the both powers; when the calculated power is below the threshold power, controlling the zero coefficient vector generating means to generate such a quantized coefficient vector that all the quantized coefficients become zero as for the corresponding signal vector, controlling the quantized coefficient vector selection output means to select the zero coefficient vector, while when the calculated power is not below the threshold power, controlling the second direction orthogonal transforming means to apply the one dimensional orthogonal transform to the corresponding signal vector in the second direction, controlling the quantizing means to quantize the obtained coefficient signal vector according to the quantization characteristic, so to generate a quantized coefficient vector, and controlling the quantized coefficient selection output means to select the corresponding quantized coefficient vector, until finishing processing of a predetermined number of signal vectors.

In the preferred construction, the controlling means further controls as follows b) with respect to the signal vector not targeted for the processing, of the second-directional signal vectors of the coefficient signal block stored in the memory, the signal vector transmitting means to take out the signal vector, the second direction orthogonal transforming means to apply one-dimensional orthogonal-transform to the signal vector in the second direction, the quantizing means to quantize the obtained coefficient signal vector according to the quantization characteristic, and the quantized coefficient selection output means to select the corresponding coefficient signal vector.

In another preferred construction, the two-dimensional orthogonal transformation is a two-dimensional discrete cosine transformation, the one-dimensional orthogonal transformation in the first direction is a one-dimensional discrete cosine transformation in the first direction, the one-dimensional orthogonal transformation in the second direction is a one-dimensional discrete cosine transformation in the second direction, and a sequence of decreasing an order of the one-dimensional discrete cosine transformation in the first direction is adopted as the order of decreasing the possibility such that all the quantized coefficients become zero as for the signal vectors.

According to another aspect of the invention, a device for performing a two-dimensional orthogonal transformation and quantization on an input pixel block, comprises first direction orthogonal transforming means for one-dimensionally orthogonal-transforming the input pixel block in a first direction, with one of a horizontal direction and a vertical direction fixed as the first direction and the other fixed as a second direction, a memory for storing a coefficient signal block supplied by the first direction orthogonal transforming means, signal vector transmitting means for taking out a second directional signal vector from the memory, second direction orthogonal transforming means for one-dimensionally orthogonal-transforming the signal vector transmitted from the signal vector transmitting means, in the second direction, quantizing means for quantizing a coefficient signal vector that is an output of the second direction orthogonal transforming means, according to a predetermined quantization characteristic, threshold obtaining means for calculating a minimum possible power to be taken by any two-dimensional orthogonal transform coefficient, quantized to a value other than zero, in the signal vector through quantization according to the quantization characteristic, by the unit of signal vector in the second direction, power calculating means for calculating the power of the signal vector transmitted from the signal vector transmitting means, value comparing means for checking whether the calculated power by the power calculating means is below a threshold calculated by the threshold obtaining means, zero coefficient vector generating means for generating a second-directional signal vector consisting of all quantized coefficients of zero, quantized coefficient selection output means for selecting one of the outputs of the quantizing means and the zero coefficient vector generating means in every second-directional signal vector, as an output coefficient signal after quantization, and controlling means for repeating the following processing a of:

a) with respect to the second-directional signal vectors of the coefficient signal block stored in the memory, controlling the signal vector transmitting means to take out each signal vector, starting from the signal vector having the highest possibility, in order of decreasing such a possibility that all the coefficients in the signal vector are quantized to zeros, controlling the power calculating means to calculate the power thereof, controlling the threshold obtaining means to calculate the threshold power corresponding to the signal vector, controlling the value comparing means to compare the both powers; when the calculated power is below the threshold power, controlling the zero coefficient vector generating means to generate such a quantized coefficient vector that all the quantized coefficients become zero as for the corresponding signal vector, controlling the quantized coefficient vector selection output means to select the zero coefficient vector, while when the calculated power is not below the threshold power, controlling the second direction orthogonal transforming means to apply the one-dimensional orthogonal transform to the corresponding signal vector in the second direction, controlling the quantizing means to quantize the obtained coefficient signal vector according to the quantization characteristic, so to generate a quantized coefficient vector, and controlling the quantized coefficient selection output means to select the corresponding quantized coefficient vector, until finishing processing for the first signal vector having the power not below the minimum possible power to be taken by any two-dimensional orthogonal transform coefficients, quantized to a value other than zero, in the signal string through quantization according to the predetermined quantization characteristic.

According to another aspect of the invention, a device for performing a two-dimensional orthogonal transformation and quantization on an input pixel block, comprises first direction orthogonal transforming means for one-dimensionally orthogonal-transforming the input pixel block in a first direction, with one of a horizontal direction and a vertical direction fixed as the first direction and the other fixed as a second direction, a memory for storing a coefficient signal block supplied by the first direction orthogonal transforming means, signal vector transmitting means for taking out a second-directional signal vector from the memory, second direction orthogonal transforming means for one-dimensionally orthogonal-transforming the signal vector transmitted from the signal vector transmitting means, in the second direction, quantizing means for quantizing a coefficient signal vector that is an output of the second direction orthogonal transforming means, according to a predetermined quantization characteristic, threshold obtaining means for calculating a minimum possible power to be taken by any two-dimensional orthogonal transform coefficient, quantized to a value other than zero, in the signal vector through quantization according to the quantization characteristic, by the unit of signal vector in the second direction, power calculating means for calculating the power of the signal vector transmitted from the signal vector transmitting means, value comparing means for checking whether the calculated power by the power calculating means is below a threshold calculated by the threshold obtaining means, zero coefficient vector generating means for generating a second-directional signal vector consisting of all quantized coefficients of zero, quantized coefficient selection output means for selecting one of the outputs of the quantizing means and the zero coefficient vector generating means in every second-directional signal vector, as an output coefficient signal after quantization, and controlling means for repeating the following processing a of:

a) with respect to the second directional signal vectors of the coefficient signal block stored in the memory, controlling the signal vector transmitting means to take out each signal vector, starting from the signal vector having the highest possibility, in order of decreasing such a possibility that all the coefficients in the signal vector are quantized to zeros, controlling the power calculating means to calculate the power thereof, controlling the threshold obtaining means to calculate the threshold power corresponding to the signal vector, controlling the value comparing means to compare the both powers; when the calculated power is below the threshold power, controlling the zero coefficient vector generating means to generate such a quantized coefficient vector that all the quantized coefficients become zero as for the corresponding signal vector, controlling the quantized coefficient vector selection output means to select the zero coefficient vector, while when the calculated power is not below the threshold power, controlling the second direction orthogonal transforming means to apply the one-dimensional orthogonal transform to the corresponding signal vector in the second direction, controlling the quantizing means to quantize the obtained coefficient signal vector according to the quantization characteristic, so to generate a quantized coefficient vector, and controlling the quantized coefficient selection output means to select the corresponding quantized coefficient vector, until finishing processing for a predetermined number of signal vectors, or if not finishing, until finishing processing for the first signal vector having the power not below the minimum possible power to be taken by any two-dimensional orthogonal transform coefficient, quantized to a value other than zero, in the signal string through quantization according to the predetermined quantization characteristic.

According to another aspect of the invention, a program for making a computer perform a two-dimensional orthogonal transformation and quantization on an input pixel block, in which the computer performs the following functions of with one of a horizontal direction and a vertical direction fixed as a first direction and the other fixed as a second direction, a) applying a one-dimensional orthogonal transform to the input pixel block in the first direction and storing the obtained coefficient signal block into a memory, b) with respect to at least one of second-directional signal vectors constituting the coefficient signal block stored in the memory, calculating a power of the signal vector as well as calculating a minimum possible power to be taken by any two-dimensional orthogonal transform coefficient, quantized to a value other than zero, in the signal string through quantization according to a predetermined quantization characteristic, so to compare the both powers; when the former power is below the latter power, generating a quantized coefficient vector consisting of all quantized coefficients of zero, and otherwise, generating a quantized coefficient vector by quantizing the coefficient signal vector obtained through the one-dimensional orthogonal transformation of the corresponding signal vector in the second direction, according to the quantization characteristic; and c) with respect to the signal vector not targeted for the processing in the function b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

According to another aspect of the invention, a program for making a computer perform a two-dimensional orthogonal transformation and quantization on an input pixel block, in which the computer performs the following functions of with one of a horizontal direction and a vertical direction fixed as a first direction and the other fixed as a second direction, a) applying a one-dimensional orthogonal transform to the input pixel block in the first direction and storing the obtained coefficient signal block into a memory, b) repeating processing of, with respect to second-directional signal vectors of the coefficient signal block stored in the memory, calculating each power of the signal vectors, starting from the signal vector having the highest possibility, in order of decreasing such a possibility that all coefficients in the signal vector are quantized to zero, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing for a predetermined number of signal vectors, and c) with respect to the signal vector not targeted for the processing in the function b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

According to a further aspect of the invention, a program for making a computer perform a two-dimensional orthogonal transformation and quantization on an input pixel block, in which the computer performs the following functions of with one of a horizontal direction and a vertical direction fixed as a first direction and the other fixed as a second direction, a) applying a one-dimensional orthogonal transform to the input pixel block in the first direction and storing the obtained coefficient signal block into a memory, b) repeating processing of, with respect to second directional signal vectors of the coefficient signal block stored in the memory, calculating each power of the signal vectors, starting from the signal vector having the highest possibility, in order of decreasing such a possibility that all coefficients in the signal vector are quantized to zeros, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing for the first signal vector having the power not below the minimum possible power to be taken by any two-dimensional orthogonal transform coefficient, quantized to a value other than zero, in the signal vector through quantization according to the predetermined quantization characteristic, and c) with respect to the signal vector not targeted for the processing in the function b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

According to a still further aspect of the invention, a program for making a computer perform a two-dimensional orthogonal transformation and quantization on an input pixel block, in which the computer performs the following functions of with one of a horizontal direction and a vertical direction fixed as a first direction and the other fixed as a second direction, a) applying a one-dimensional orthogonal transform to the input pixel block in the first direction and storing the obtained coefficient signal block into a memory, b) repeating processing of, with respect to second-directional signal vectors of the coefficient signal block stored in the memory, calculating each power of the signal vectors, starting from the signal vector having the highest possibility, in order of decreasing such a possibility that all coefficients in the signal vector are quantized to zeros, as well as calculating a minimum possible power to be taken by any two-dimensional orthogonal transform coefficient, quantized to a value other than zero, in the signal vector through quantization according to a predetermined quantization characteristic, so to compare the both powers; when the former power is below the latter power, generating a quantized coefficient vector consisting of all the quantized coefficients of zero, and otherwise, generating a quantized coefficient vector by quantizing the coefficient signal vector obtained through the one-dimensional orthogonal transformation of the corresponding signal vector in the second direction, according to the quantization characteristic, until finishing processing for a predetermined number of signal vectors, or if not finishing, until finishing processing for the first signal vector having the power not below the minimum possible power to be taken by any two-dimensional orthogonal transform coefficient, in the signal vector quantized to a value other than zero, through quantization according to the predetermined quantization characteristic, and c) with respect to the signal vector not targeted for the processing in the function b), of the second-directional signal vectors of the coefficient signal block stored in the memory, generating a quantized coefficient vector by quantizing the coefficient signal vector obtained through the one-dimensional orthogonal transformation of the signal vector in the second direction, according to the quantization characteristic.

According to the two-dimensional orthogonal transformation and quantization method and device of the first invention, vertical direction orthogonal transformation and quantization processing according to a zero detection method is performed on one or all of the signal vectors, of M signal vectors included in a M×N signal block orthogonal-transformed in a horizontal direction, while the usual vertical direction orthogonal transformation and quantization is performed on the rest of the signal vectors. Therefore, by adopting the zero detection method to one or all of the signal vectors having a high possibility that the output result after quantization becomes zero, the calculation amount required for the vertical direction orthogonal transformation and quantization processing can be effectively reduced on the whole image. Further, the zero detection method is not adopted to the rest of the signal vectors, which can restrain an increase of unnecessary calculation.

According to the two-dimensional orthogonal transformation and quantization method and device according to the second embodiment, the zero detection method is used in one or all of the signal vectors put into the order, of the M signal vectors included in a M×N signal block orthogonal-transformed in a horizontal direction, according to the same order, and the usual vertical direction orthogonal transformation and quantization is performed on a signal vector of the order lower than the signal vector which could not cut the calculation amount in the zero detection method and a signal vector not included in the above one or all of the signal vectors. Therefore, by adopting the zero detection method to the signal vectors sequentially from a signal vector of the highest possibility that the output result after quantization may become zero, the calculation amount required for the vertical direction orthogonal transformation and quantization processing can be effectively reduced on the whole image. By avoiding the use of the zero detection method for the signal vector which is not expected to reduce the calculation amount, an increase of the unnecessary calculation can be restrained.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
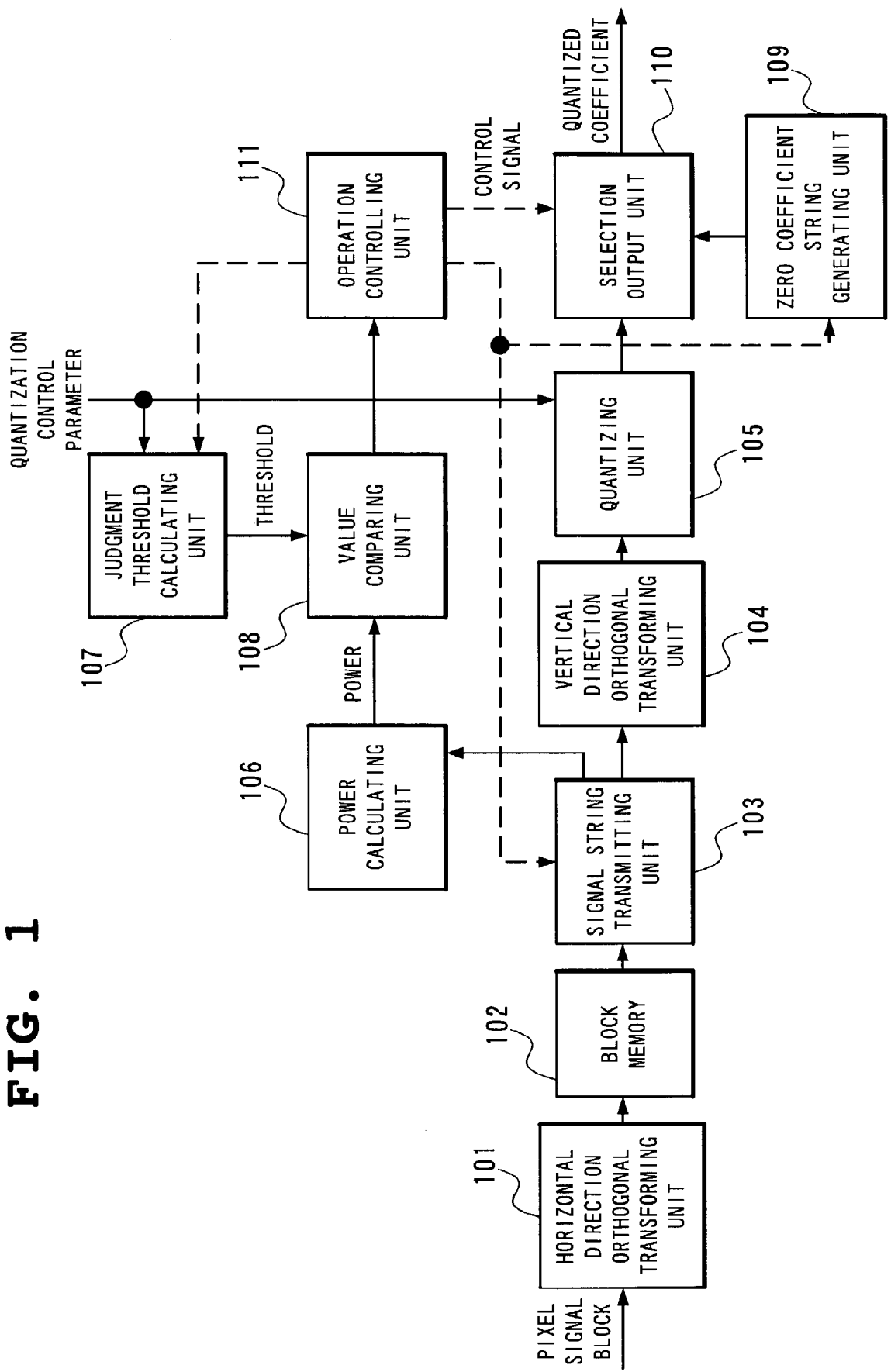
FIG. 1 is a view showing the structure of the first embodiment of the invention.
Figure 2:
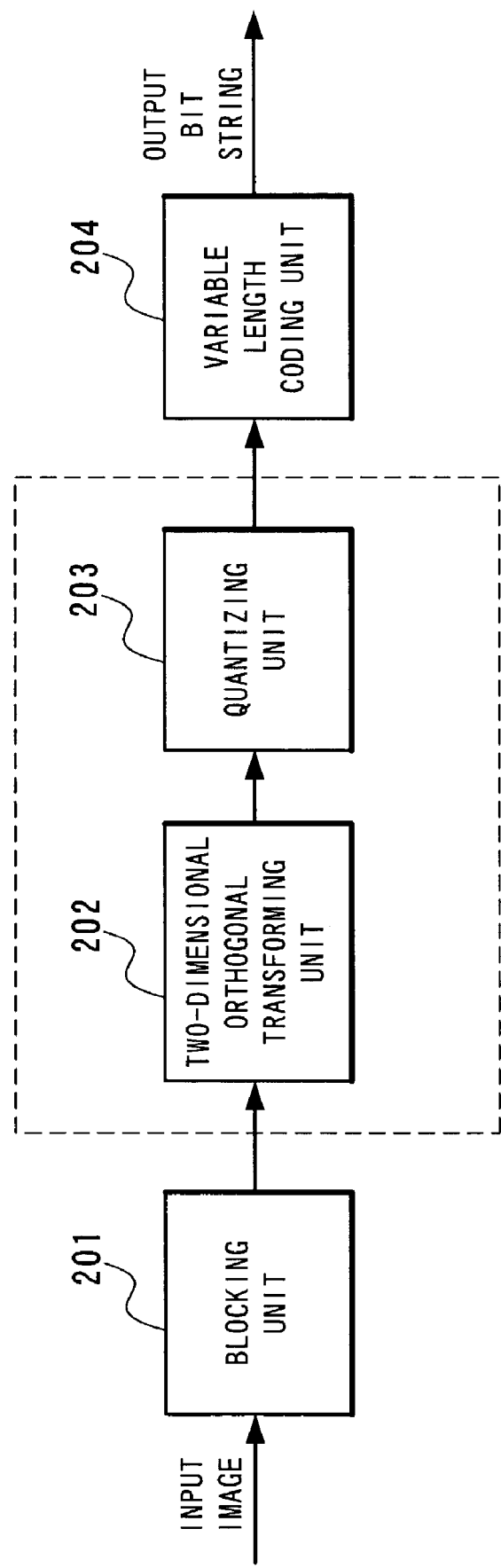
FIG. 2 is a view showing an example of the still image compact encoder by combination of transform coding technique and quantization technique.
Figure 3:
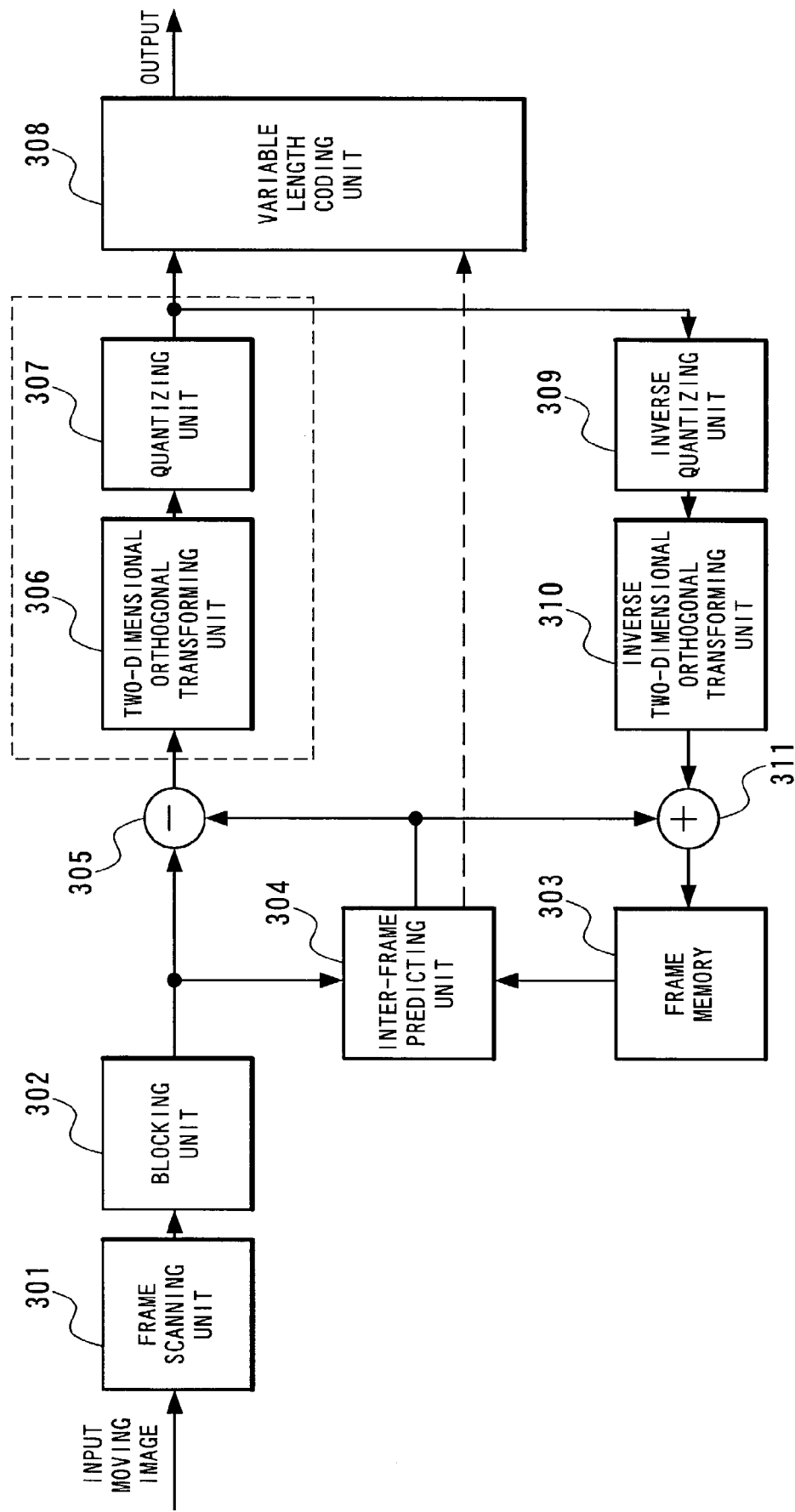
FIG. 3 is a view showing an example of the moving image compact encoder by combination of transform coding technique and quantization technique.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The principle of the present invention will be described at first by using the mathematical expressions.

For the preparation, it is defined as follows. The size of a pixel block to be received by the two-dimensional orthogonal transformation and quantization processing unit to which the invention is adopted is defined as M×N (N row M vector) (M and N are positive integers). The signal value of the input pixel block is defined as $f(x, y)$ ($0 \leq x < M$, $0 \leq y < N$) (x and y are integers), and a coefficient after performing the two-dimensional orthogonal transformation T on $f(x, y)$ is defined as $F(u, v)$ ($0 \leq u < M$, $0 \leq v < N$) (u and v are integers). Further, a quantized coefficient after performing the quantization on $F(u, v)$ is defined as $QF(u, v)$ ($0 \leq u < M$, $0 \leq v < N$) (u and v are integers).

This time, assumptions of the invention will be shown.

As a first condition, assume that the two-dimensional orthogonal transformation T realized by the invention is the two-dimensional orthogonal transformation having the characteristic (matrix resolution) such that an image is resolved in a repetition of the one-dimensional orthogonal transformation T1 in a direction of row and the one-dimensional orthogonal transformation T2 in a direction of vector, like the two-dimensional discrete cosine transformation. Namely, when an intermediate signal after performing the horizontal direction-orthogonal transformation T1 on each row of the input pixel block $f(x, y)$ is represented by $g(u, v)$ ($0 \leq u < M$, $0 \leq v < N$) (u and v are integers), $F(u, v)$ has to agree with the result of performing the vertical direction-orthogonal transformation T2 on each vector of $g(u,$ For example, the two-dimensional discrete cosine transformation represented by the expression 1 is resolved into a repetition of the M-point one-dimensional discrete cosine transformation in a horizontal direction and the N-point one-dimensional discrete cosine transformation in a vertical direction, as shown in the expression 2 and the expression 3.

$$F(u, v) = \frac{2C(u)C(v)}{\sqrt{MN}} \sum_{x=0}^{M-1} \sum_{y=0}^{N-1} f(x, y) \quad \text{[EXPRESSION 1]}$$

$$\cos\left[\frac{(2x+1)}{2M}u\right]\cos\left[\frac{(2y+1)}{2N}v\right]$$

$$C(u), C(v) = \begin{cases} 1/\sqrt{2} & (u = 0, V = 0) \\ 1 & (u \neq 0, v \neq 0) \end{cases}$$

$$F(u, v) = \sqrt{\frac{2}{N}} C(v) \sum_{y=0}^{N-1} g(u, v)\cos\left[\frac{(2y+1)\pi}{2N}v\right] \quad \text{[EXPRESSION 2]}$$

$$g(u, y) = \quad \text{[EXPRESSION 3]}$$

$$\sqrt{\frac{2}{M}} C(u) \sum_{y=0}^{M-1} f(x, y)\cos\left[\frac{(2x+1)\pi}{2M}u\right]$$

As a second condition, assume that the quantization realized by the invention is the quantization having the characteristic of quantizing to zero the orthogonal transform coefficient having some value in the vicinity of zero within a predetermined range. The characteristic of linear or non-linear does not matter.

Under these conditions, in the sets of arbitrary integers (u, v) (0≦u<M, 0≦v<N), Z(u, v) is defined as the minimum of the power which the signal F(u, v) before quantization should never come below so that the QF (u, v) of the (u, v) component of the quantized coefficient can take a value other than zero, in other words, the maximum Z(u, v) that satisfies the relationship of the expression 4. The symbol "⇒" in each expression means that the conditional expression at the left side of "⇒" is a sufficient condition for satisfying the conditional expression at the right side of "⇒". Further, Z(u) is defined as the minimum value about v of Z(u, v), on any integer u (0≦u<M) (expression 5).

$$|F(u,v)|^2 < Z(u,v) \Rightarrow QF(u,v) = 0 \quad \text{[EXPRESSION 4]}$$

$$Z(u) = \min\{Z(u,v')|v'=0,1,\ldots,N-1\} \quad \text{[EXPRESSION 5]}$$

Figure 4:
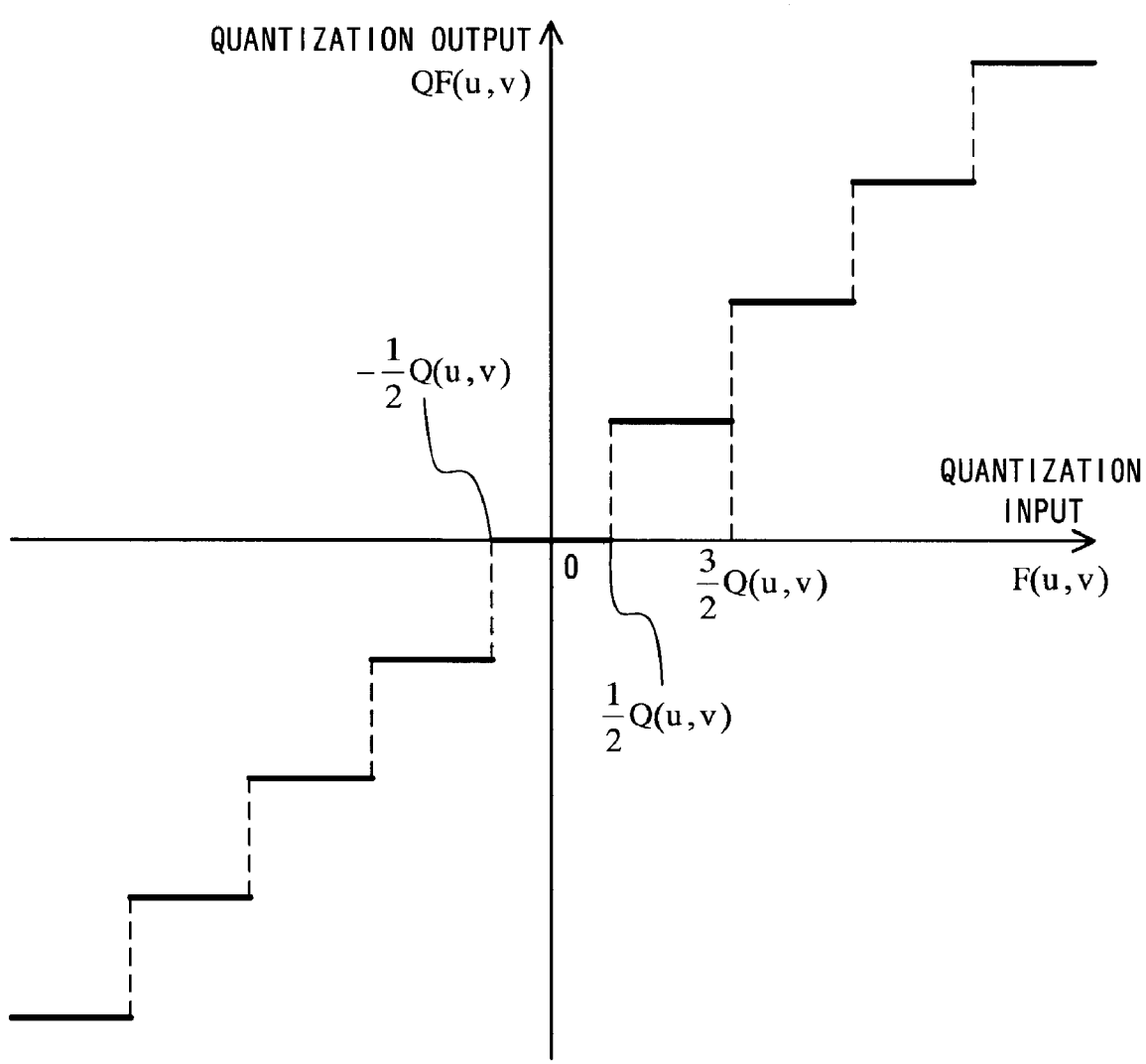
FIG. 4 is a view showing a first example of the quantization characteristics of the quantization to which the invention can be adopted.

As an example, the quantization shown in the expression 6 and in FIG. 4 will be considered. In the expression 6, the round function indicates the rounding to the nearest integer and Q(u, v) is the (u, v) component of the quantization matrix. The horizontal axis of the graph of FIG. 4 indicates the signal F(u, v) before quantization and the vertical axis indicates the signal value obtained by inverse-quantizing the quantized signal QF(u, v). As apparent from FIG. 4, Q(u, v) and Z(u, v) satisfy the relationship of the expression 7. Further, Q(u, v) and Z(u) satisfy the relationship of the expression 8, according to the expression 5.

$$QF(u, v) = \text{round}\left(\frac{F(u, v)}{Q(u, v)}\right) \quad \text{[EXPRESSION 6]}$$

$$Z(u, v) = \left|\frac{1}{2}Q(u, v)\right|^2 \quad \text{[EXPRESSION 7]}$$

$$Z(u) = \left|\frac{1}{2}\min\{Q(u, v') \mid v' = 0, 1, \ldots, N-1\}\right|^2 \quad \text{[EXPRESSION 8]}$$

Figure 5:
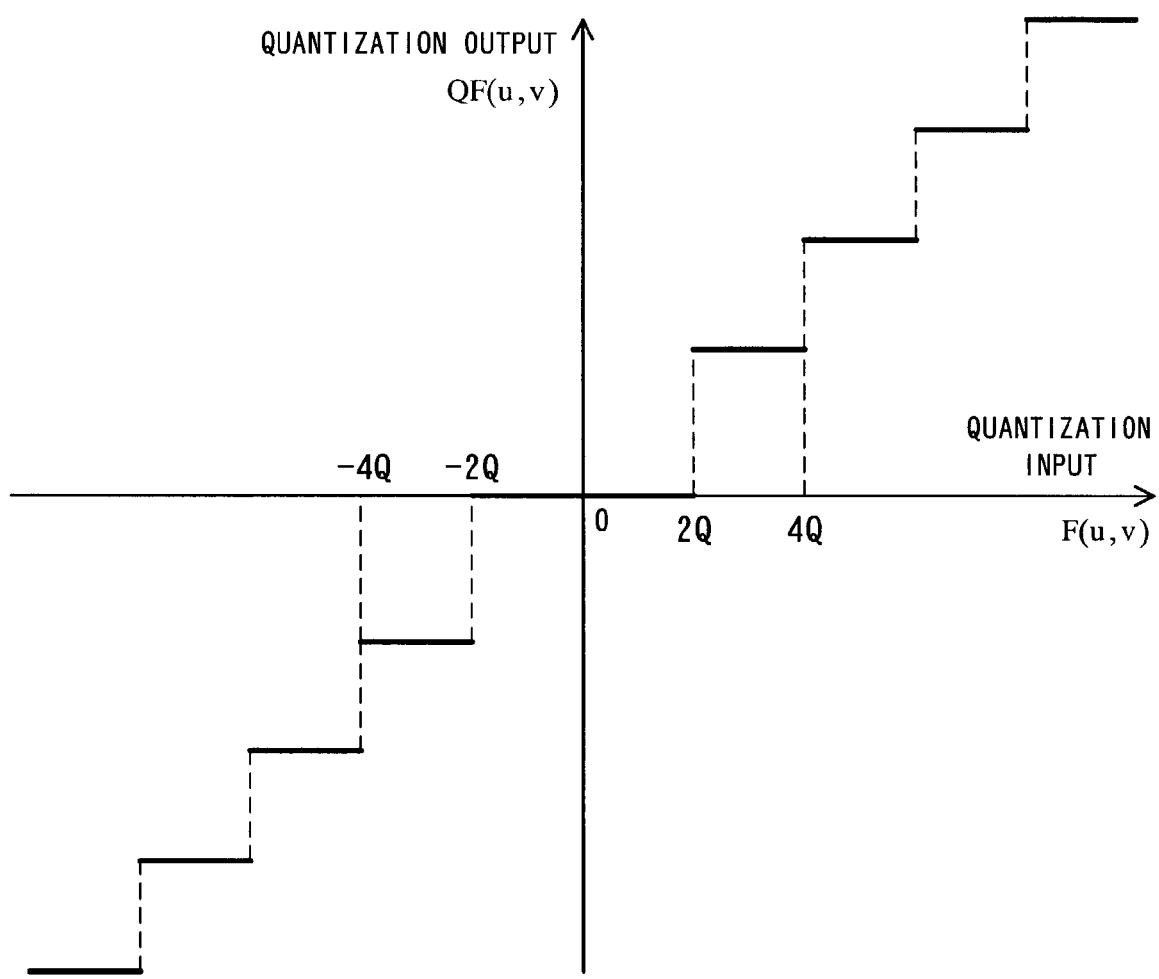
FIG. 5 is a view showing a second example of the quantization characteristics of the quantization to which the invention can be adopted.

As another example, the quantization shown in the expression 9 and in FIG. 5 will be considered. In the expression 9, the floor function indicates the maximum integer less than the original numerical value and Q indicates the quantization parameter. Assume that the value of Q does not depend on (u, v) and that all the components are uniformly quantized. As apparent from the figure, Q(u, v) and Z(u, v) and Z(u) satisfy the relationship of the expression 10.

$$QF(u, v) = \begin{cases} \text{floor}\left(\frac{|F(u,v)|}{2Q}\right) & (F(u, v) \geq 0) \\ -\text{floor}\left(\frac{|F(u,v)|}{2Q}\right) & (F(u, v) < 0) \end{cases} \quad \text{[EXPRESSION 9]}$$

$$Z(u) = Z(u,v) = 4Q^2 \quad \text{[EXPRESSION 10]}$$

When the power of F(u, v) is below the threshold Z(u), according to the definition of Z(u), since the power of F(u, v) is always below the threshold Z(u, v), the relationship of the expression 11 is satisfied according to the expression 4.

$$|F(u,v)|^2 < Z(u) \Rightarrow QF(u,v) = 0 \quad \text{[EXPRESSION 11]}$$

Since the power takes a non-negative value, the power of one signal value F(u, v) cannot be above the whole power of the signal vector including F(u, v). Namely, the expression 12 is satisfied as for any (u, v). Thus, the relationship of the expression 13 is satisfied. The relationship of the expression 14 is introduced from the satisfaction of the relationship of the expression 13 as for any v and the relationship of the expression 11.

$$|F(u, v)|^2 \leq \sum_{v'=0}^{N-1} |F(u, v')|^2 \quad \text{[EXPRESSION 12]}$$

$$\sum_{v'=0}^{N-1} |F(u, v')|^2 < Z(u) \Rightarrow |F(u, v)|^2 < Z(u) \quad \text{[EXPRESSION 13]}$$

$$\sum_{v'=0}^{N-1} |F(u, v')|^2 < Z(u) \Rightarrow |F(u, 0)|^2 < Z(u), \quad \text{[EXPRESSION 14]}$$

$$|F(u, 1)|^2 < Z(u), \ldots,$$
$$|F(u, N-1)|^2 < Z(u) \Rightarrow QF(u, 0) =$$
$$QF(u, 1) = \ldots = QF(u, N-1) = 0$$

One of the features of the orthogonal transformation is that the power of a signal is preserved, namely, that the power of an input signal and the power of an output signal are in one accord. Considering this characteristic in the vertical direction-orthogonal transformation indicated by the expression 2, the power of the u-th vector of the signal vector in the signal g(u, y) orthogonal-transformed in a horizontal direction agrees with the power of the u-th vector of the signal vector in the transform coefficient F(u, v) after performing the vertical direction-orthogonal transformation on the signal g(u, y). Namely, the relationship of the expression 15 is satisfied.

$$\sum_{v'=0}^{N-1} |F(u, v')|^2 < \sum_{y=0}^{N-1} |g(u, y)|^2 \quad \text{[EXPRESSION 15]}$$

Adopting the expression 15 to the relationship of the expression 14 results in that the expression 16 is satisfied as for any u. This relation indicates that the u-th vector of the coefficient QF(u, v) after quantization turns all zero when the power P(u) of the u-th signal vector in the signal g(u, y) orthogonal-transformed in a horizontal direction is below the power threshold Z(u).

$$\sum_{y=0}^{N-1} |g(u, y)|^2 < Z(u) \Rightarrow QF(u, 0) = \quad \text{[EXPRESSION 16]}$$

$$QF(u, 1) = \ldots = QF(u, N-1) = 0$$

By using the result of the expression 16, g(u, y) obtained by orthogonally transforming the input pixel block f(x, y) in a horizontal direction and the power P(u) of the u-th signal vector of g(u, y) as for some integer u (0≦u<M) are calculated, and when P(u) is below the power threshold Z(u), the vertical direction-orthogonal transformation and the quantization for calculating the u-th coefficient vector of the quantized coefficient block QF(u, v) can be omitted and instead, a zero coefficient vector consisting of all the coefficients of zero can be generated and supplied as the calculation result of the u-th vector of the quantized coefficient QF(u, v). When P(u) is above or equal to the power threshold Z(u), the usual vertical direction-orthogonal transformation and quantization is performed on the u-th signal vector of g(u, y). In the following description, this method of vertical direction-orthogonal transformation and quantization will be called a zero detection method.

Generally, a large amount of calculation is required for the orthogonal transformation and quantization processing. On the contrary, the processing of supplying the quantized coefficient vector of all zero needs a small amount of calculation. Further, the calculation amount required for the power calculation of the signal vector is also small. Therefore, it is possible to reduce the calculation amount required for the vertical direction-orthogonal transformation and the quantization on the whole image, by adopting the zero detection method to a signal vector characterized by having a high possibility such that the power $P(u)$ of the u-th signal vector may be below the power threshold $Z(u)$. As a result, the two-dimensional orthogonal transformation and the quantization can be realized at a higher speed with a lower power consumption.

In many of the still image compact coding methods and the moving image compact coding methods, high-efficiency compact coding is realized by concentrating the signal power distribution of an input pixel block on one of the transform coefficients by the orthogonal transformation. In this compact coding, there are a lot of transform coefficients of distributing each signal power to a small value near zero. Therefore, the calculation amount required for the vertical direction-orthogonal transformation and the quantization can be much reduced on the whole image, by adopting the zero detection method to the calculation for the quantization of a signal vector consisting of transform coefficients having the characteristic of distributing a signal to a small value near zero.

A device for the two-dimensional orthogonal transformation and quantization processing according to the first embodiment comprises first direction orthogonal transforming means for performing the one-dimensional orthogonal transformation on an input pixel block in a first direction, with one of a horizontal direction and a vertical direction fixed as the first direction and the other fixed as a second direction different from the first direction, a block memory for storing coefficient signals supplied by the first direction orthogonal transforming means, signal vector transmitting means for scanning the coefficient signal stored in the block memory to take out the corresponding signal vector in the second direction, second direction orthogonal transforming means for performing the one-dimensional orthogonal transformation on the signal vector transmitted from the signal vector transmitting means in the second direction, quantizing means for quantizing an output coefficient signal of the second direction orthogonal transforming means according to a predetermined quantization characteristic, threshold obtaining means for calculating the minimum possible power to be taken by the two-dimensional orthogonal transform coefficient, quantized to a value other than zero, through the quantization having the above quantization characteristic by the unit of signal vector in the second direction, power calculating means for calculating the power of the signal vector transmitted from the signal vector transmitting means, value comparing means for judging whether or not the calculated power by the power calculating means is below the threshold calculated by the threshold obtaining means and supplying the result in Yes or No, zero coefficient vector generating means for generating a signal vector of the second direction consisting of all the quantized coefficients of zero, quantized coefficient selection output means for selecting one of the output of the quantizing means and the output of the zero coefficient vector generating means in every signal vector of the second direction, as an output coefficient signal after quantization, and a control unit for controlling the operations of the signal vector transmitting means, the threshold obtaining means, the zero coefficient generating means, and the quantized coefficient selection output means.

The control unit controls the signal vector transmitting means, the power calculating means, the threshold obtaining means, and the value comparing means so as to compare the power of a corresponding signal vector with the calculated threshold, with respect to one or all of the signal vectors, of the signal vectors in the second direction stored in the block memory. When the comparison results in that the power is larger than the threshold, the control unit controls the zero coefficient generating means and the quantized coefficient selection output means so as to supply the signal vector obtained by operating the zero coefficient generating means as a quantization signal, while when it results in that it is smaller than the threshold, the control unit controls the signal vector transmitting means, the second direction orthogonal transforming means, the quantizing means, and the quantized coefficient selection output means so as to supply the signal vector obtained by operating the second direction orthogonal transforming means and the quantizing means as for the corresponding signal vector, as an output quantization signal, and it controls the signal vector transmitting means, the second direction orthogonal transforming means, the quantizing means, and the quantized coefficient selection output means so as to supply the signal vector obtained by operating the second direction orthogonal transforming means and the quantizing means as for a corresponding signal vector, as a quantized signal, with respect to the signal vectors not included in the above one or all of the signal vectors.

First Embodiment

A first embodiment of the invention will be described with reference to the drawings.

FIG. 1 shows the first embodiment of the invention, and it indicates the structure of the two-dimensional orthogonal transformation and quantization processing unit in a digital still image compact encoder or a digital moving image compact encoder. The two-dimensional orthogonal transformation and quantization processing unit shown in FIG. 1 receives a pixel block of M×N (N row M vector) and a parameter for specifying the quantization characteristic, and supplies the quantized coefficient block of the similar M×N (N row M vector).

In FIG. 1, the reference numeral 101 indicates a horizontal direction orthogonal transforming unit for orthogonal-transforming an input pixel block at an M point in a horizontal direction, the reference numeral 102 indicates a block memory for storing the output signal of the horizontal direction orthogonal transforming unit 101, the reference numeral 103 indicates a signal vector transmitting unit for taking out a signal in a vertical direction from the block memory 102 by the vector, the reference numeral 104 indicates a vertical direction orthogonal transforming unit for orthogonal-transforming the signal vector transmitted by the signal vector transmitting unit 103 at an N point, the reference numeral 105 indicates a quantizing unit for quantizing the output signal of the vertical direction-orthogonal transforming unit 104, the reference numeral 106 indicates a power calculating unit for calculating the power of the signal vector transmitted by the signal vector transmitting unit 103, the reference numeral 107 indicates a threshold obtaining unit for calculating the threshold according to a predetermined quantization characteristic, the reference numeral 108 indicates a value comparing unit for comparing the power calculated by the power calculating unit 106 with the threshold calculated by the threshold obtaining unit 107, the reference numeral 109 indicates a zero coefficient vector generating unit for generating a quantized coefficient vector consisting of all zero, the reference numeral 110 indicates a selection output unit for selecting one of the output of the quantizing unit 105 and the output of the zero coefficient vector generating unit 109 and supplying it, and the reference numeral 111 indicates an operation controlling unit for controlling the operations of the above processing units.

The operation of the first embodiment of the invention will be described with reference to the flow chart shown in FIG. 6.

In the description, the signal vector of the signal block stored in the block memory 102 and the signal vector of the supplied quantized coefficient block are represented as the u-th signal vector ($0 \leq u < M$)(u is the integer). In the first embodiment, though any correspondence will do between the vector number u and the actual signal, it is preferable to make the signal vector consisting of the transform coefficients expected to distribute the power to a large value according to the power distribution characteristic of the output coefficient of the horizontal direction-orthogonal transformation, into correspondence with the small vector number u, in order to reduce the calculation amount of the two-dimensional orthogonal transformation and quantization as much as possible. For example, when using the discrete cosine transformation as the orthogonal transformation, it is preferable to assign the signal vector consisting of the direct current component to the vector number u=0 and the signal vector consisting of the u-th order alternative component to u>0.

The value of k described later, which defines the adaptive range of the zero detection method is previously determined in consideration of the quantization characteristic and the power distribution characteristic after orthogonal transformation (in short, detection probability of zero vector) and the ratio of the calculation amount required for the zero vector detecting processing and the calculation amount reduced when replacing the vertical direction-orthogonal transformation and quantization processing with the zero vector detecting processing of a signal vector consisting of zero. Namely, the value of k preferably takes such a value that the zero detection is adopted to only the vector expected to have a larger effect above the cost taken for the zero detection. When the preferable value of k is uniquely determined depending on the type of the digital still image and digital moving image targeted for compression (picture of nature and man), there is also a method of previously determining the preferable value of k in every type of image and storing it in a table and then reading out the k of the value corresponding to the type of the image to be compressed, for the setting.

Figure 6:
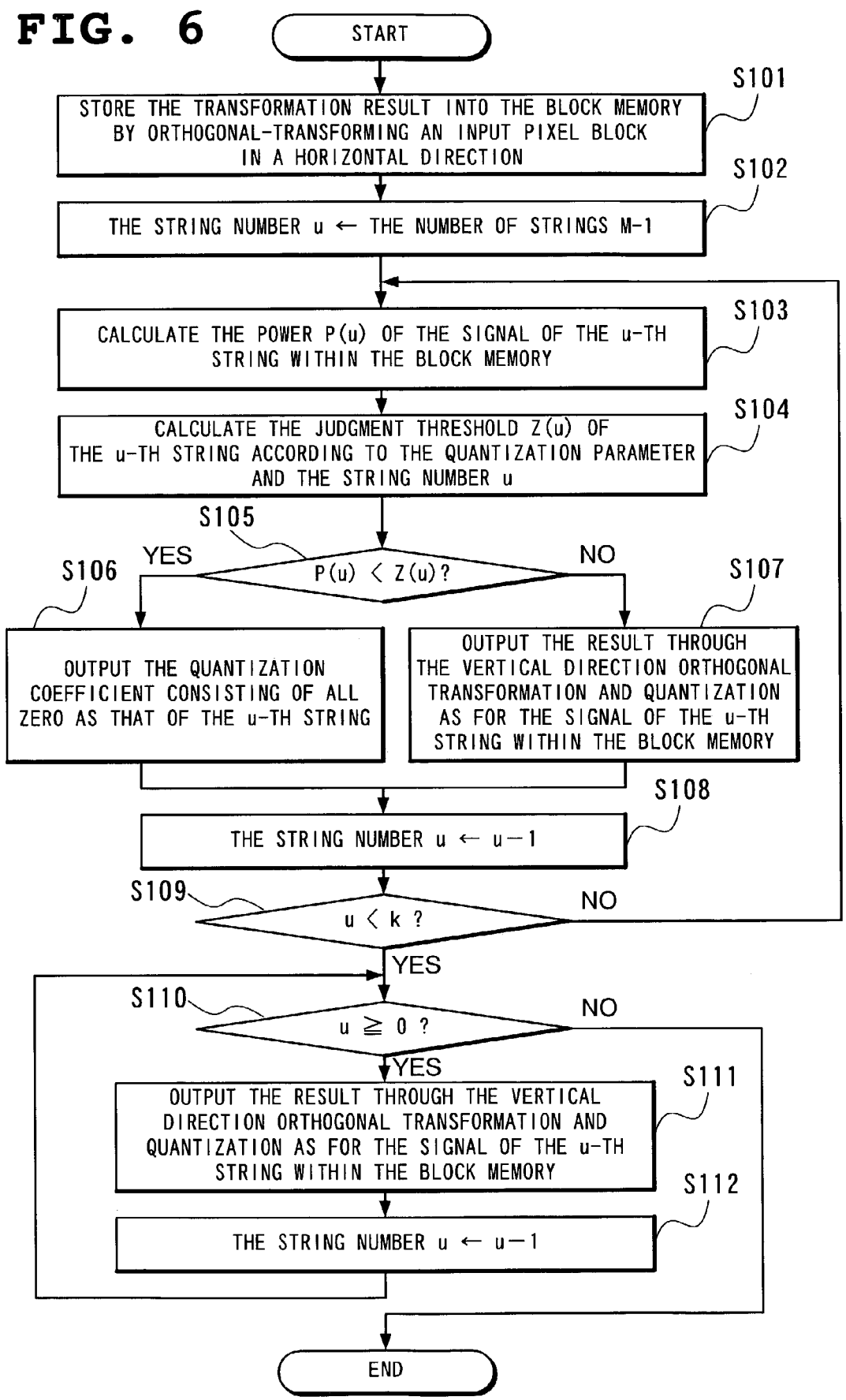
FIG. 6 is a view showing the operational procedure of the first embodiment.

A series of the procedure from Step S101 in FIG. 6 starts when the two-dimensional orthogonal transformation and quantization processing unit receives a pixel block of M×N (N row M vector).

At first, in Step S101, the horizontal direction orthogonal transforming unit 101 orthogonally transforms all the rows within the input pixel block one-dimensionally at the M point in a horizontal direction and stores the transformation result into the block memory 102.

Then, in Step S102, the vector number counter u provided in the operation controlling unit 111 is initialized to a value obtained by subtracting 1 from the vector number M.

In Step S103, the signal vector transmitting unit 103 takes out the u-th signal vector from the block memory 102, according to the value of the vector number counter u, and the power calculating unit 106 calculates the power P(u) of the taken signal vector according to the sum of squares of the N signal values forming the signal vector.

In Step S104, the threshold obtaining unit 107 calculates the threshold Z(u), referring to the quantization control parameter and the vector number counter u. The threshold Z(u) is defined as follows. As a result of quantizing the component (u, v) of the coefficient after the two-dimensional orthogonal transformation according to the quantization characteristic defined by the quantization control parameter, the minimum value other than zero of the signal power quantized is defined as Z(u, v) and the minimum value of Z(u, v) in changing the integer v from 0 to N−1 is defined as Z(u).

In Step S105, the value comparing unit 108 compares the power P(u) with the threshold Z(u); when the power P(u) is below the threshold Z(u), this step proceeds to Step S106, while when the power P(u) is the threshold Z(u) and above, this step proceeds to Step S107.

When it proceeds to Step S106, the zero coefficient vector generating unit 109 generates a quantized coefficient vector consisting of all the coefficients of zero and the selection output unit 110 selects the generated zero coefficient vector to supply it as the calculation result of the u-th vector of the quantized coefficient block. Thereafter, it proceeds to Step S108.

While, when it proceeds to Step S107, the signal vector transmitting unit 103 takes out the u-th signal vector from the block memory 102 and the vertical direction orthogonal transforming unit 104 orthogonally transforms the taken signal vector one-dimensionally at the N-point in a vertical direction. The quantizing unit 105 quantizes the obtained transform coefficient according to a predetermined quantization characteristic specified by the quantization parameter and the selection output unit 110 selects its output to supply it as the calculation result of the u-th vector of the quantized coefficient. Thereafter, it proceeds to Step S108.

In Step S108, the value of the vector number counter u is decreased by 1, and this step proceeds to Step S109. In Step S109, whether the value of the vector number counter u is below a predetermined integer k ($0 \leq k < M$) is checked; when the vector number u is below k, it proceeds to Step S110, and when the vector number u is k and above, this step is returned to Step S103, where the quantized coefficient output processing will be repeated on the next signal vector.

In Step S110, whether the value of the vector number counter u is zero and above is checked. When the vector number u is zero and above, it proceeds to Step S111. When the vector number u is a negative value, since all the two-dimensional orthogonal transformation and quantization processing has been completed, a series of processing is stopped and the next input of a pixel block is waited.

When it proceeds to Step S11, the u-th signal vector of the block memory 102 is orthogonal-transformed two-dimensionally and quantized and the obtained coefficient is supplied as the calculation result of the u-th vector in the same way as Step 107.

In Step S112, the value of the vector number counter u is decreased by 1 and the processing from Step S110 will be repeated again.

The above is the operation of the first embodiment of the invention.

As a concrete method for realizing the horizontal direction orthogonal transforming unit 101 in the first embodiment of the invention, any method will do as far as it is a method of orthogonal-transforming N signal rows included in the M×N input pixel block at a predetermined M-point one-dimensionally.

As a concrete method for realizing the vertical direction orthogonal transforming unit 104, any method will do as far as it is a method of orthogonal-transforming the signal vector transmitted from the signal vector transmitting unit 103 one dimensionally at a predetermined N-point.

As a concrete method for realizing the quantizing unit 105, any method will do as far as it is a method for quantizing the orthogonal transform coefficient vector supplied from the vertical direction orthogonal transforming unit 104 according to a predetermined quantization characteristic.

As a concrete method for realizing the threshold obtaining unit 107, any method will do as far as it is a method of calculating the defined threshold $Z(u)$. For example, each value obtained by calculating $Z(u)$ in every different quantization parameter is previously stored in a table memory and the threshold obtaining unit 107 may take out the value stored in the table memory in case of necessity. Alternatively, the threshold obtaining unit 107 may calculate and require the value in case of necessity, according to the relational expression for calculating the threshold $Z(u)$ from the quantization parameter and the vector number u.

According to the above-mentioned first embodiment, whether or not such a sufficient condition that all the coefficients after quantization can become zero is satisfied is checked, as for the (M−k) signal vectors from the k-th vector to the (M−1)-th vector, of the M signal vectors within the transform coefficient which has orthogonal-transformed an input pixel block in a horizontal direction, according to the value of the power of the signal vector. The calculation amount required for the vertical direction orthogonal transformation and quantization processing can be reduced on the whole image by omitting the vertical direction orthogonal transformation and quantization processing as for the signal vector satisfying the condition and simply supplying the quantized coefficient of zero there. Further, it is possible to restrain an increase of unnecessary calculation by executing the vertical direction orthogonal transformation and quantization processing on k signal vectors from the 0-th vector to the (k−1)-th vector, without checking as mentioned above. As a result, according to the first embodiment of the invention, the two-dimensional orthogonal transformation and quantization processing can be performed at a higher speed and with a lower power consumption.

A device for the two-dimensional orthogonal transformation and quantization processing according to the second embodiment comprises first direction orthogonal transforming means for performing the one-dimensional orthogonal transformation on an input pixel block in a first direction, with one of a horizontal direction and a vertical direction fixed as the first direction and the other fixed as a second direction different from the first direction, a block memory for storing coefficient signals supplied by the first direction orthogonal transforming means, signal vector transmitting means for scanning the coefficient signal stored in the block memory to take out the corresponding signal vector in the second direction, second direction orthogonal transforming means for performing the one-dimensional orthogonal transformation on the signal vector transmitted from the signal vector transmitting means in the second direction, quantizing means for quantizing an output coefficient signal of the second direction orthogonal transforming means according to a predetermined quantization characteristic, threshold obtaining means for calculating the minimum possible power to be taken by the two-dimensional orthogonal transform coefficient, quantized to a value other than zero, through the quantization having the above quantization characteristic by the unit of signal vector in the second direction, power calculating means for calculating the power of the signal vector transmitted by the signal vector transmitting means, value comparing means for judging whether or not the calculated power by the power calculating means is below the threshold calculated by the threshold obtaining means and supplying the result in Yes or No, zero coefficient vector generating means for generating a signal vector of the second direction consisting of all the quantized coefficients of zero, quantized coefficient selection output means for selecting one of the output of the quantizing means and the output of the zero coefficient vector generating means in every signal vector of the second direction, as an output coefficient signal after quantization, and a control unit for controlling the operations of the signal vector transmitting means, the threshold obtaining means, the zero coefficient generating means, and the quantized coefficient selection output means.

The control unit controls the signal vector transmitting means, the power calculating means, the threshold obtaining means, and the value comparing means so as to compare the power of each corresponding signal vector with the calculated threshold, with respect to one or all of the signal vectors put in the order, of the second-directional signal vectors stored in the block memory, repeatedly from the head according to the above order until it results in that the power is smaller than the threshold. The control unit controls the zero coefficient generating means and the quantized coefficient selection output means so as to supply the signal vector obtained by operating the zero coefficient generating means, as a quantization signal, to a signal vector resulting in that the power is larger than the threshold in the above repetition. While, the control unit controls the signal vector transmitting means, the second direction orthogonal transforming means, the quantizing means, and the quantized coefficient selection output means so as to supply the signal vector obtained by operating the second direction orthogonal transforming means and the quantizing means as for a corresponding signal vector, as an output quantization signal, to a signal vector resulting in that it is smaller than the threshold and accordingly interrupting the repetition and a signal vector put in the order lower than the signal vector interrupting the repetition. It controls the signal vector transmitting means, the second direction orthogonal transforming means, the quantizing means, and the quantized coefficient selection output means so as to supply the signal vector obtained by operating the second direction orthogonal transforming means and the quantizing means as for a corresponding signal vector, as a quantized signal, to a signal vector not included in the above one or all of the signal vectors.

Second Embodiment

A second embodiment of the invention will be described this time. The basic structure of the second embodiment is the same as that of the first embodiment shown in FIG. 1, and a difference is mainly found in the control operation of the operation controlling unit 111. Hereafter, the operation procedure in the second embodiment will be described mainly about the difference from the first embodiment, with reference to the flow chart shown in FIG. 7.

Figure 7:
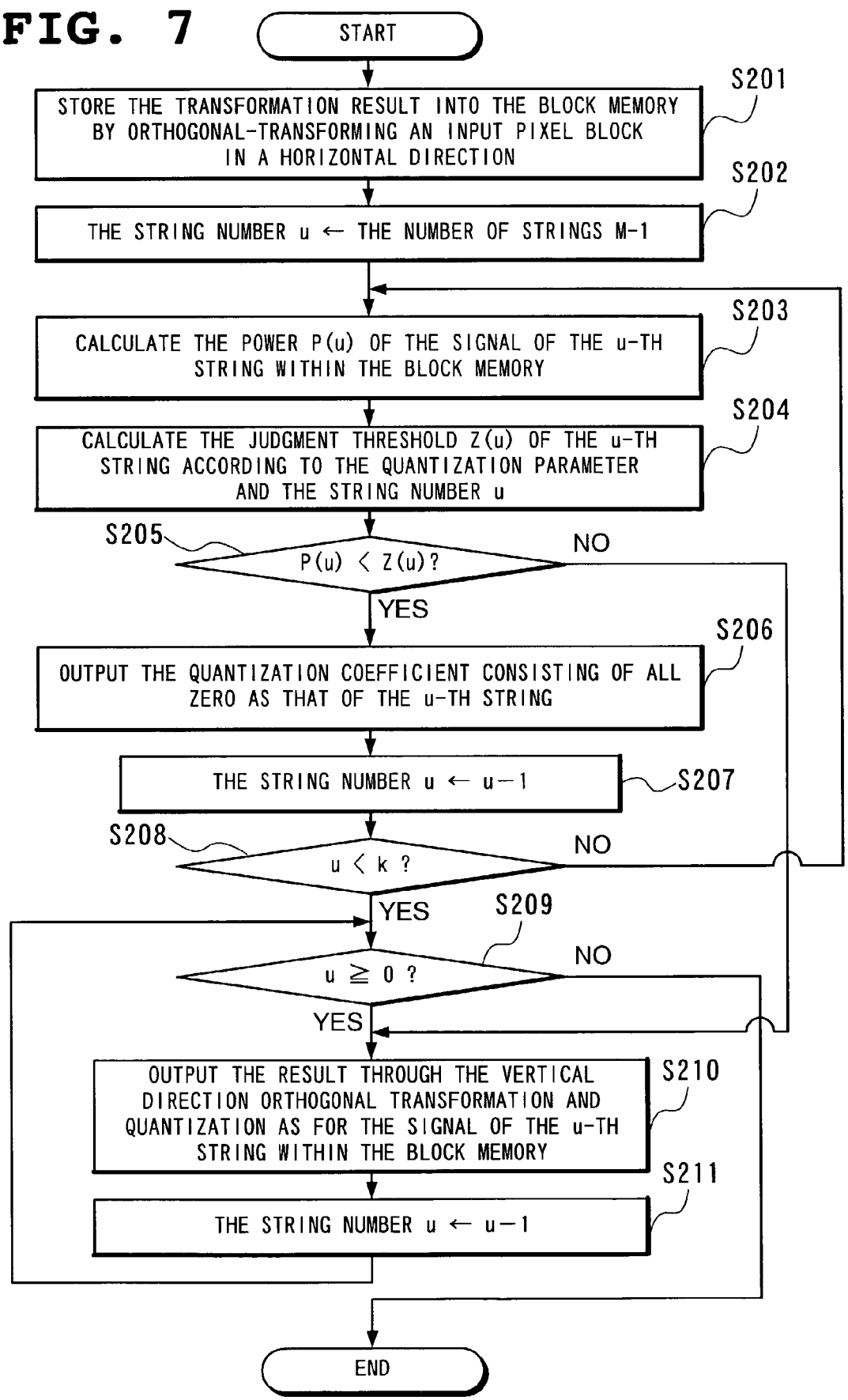
FIG. 7 is a view showing the operational procedure of the second embodiment.

A series of the procedure from Step S201 of FIG. 7 starts when the two-dimensional orthogonal transformation and quantization processing unit receives a pixel block of (M×N) (N row M vector).

At first, in Step S201, the horizontal direction orthogonal transforming unit 101 orthogonally transforms all the rows within the input pixel block one-dimensionally at the M-point in a horizontal direction and stores the transformation result into the block memory 102.

In Step S202, the vector number counter u provided in the operation controlling unit 111 is initialized to a value obtained by subtracting 1 from the vector number M.

In Step S203, the signal vector transmitting unit 103 takes out the u-th signal vector from the block memory 102, according to the value of the vector number counter u, and the power calculating unit 106 calculates the power $P(u)$ of the taken signal vector by the sum of squares of the N signal values forming the signal vector.

In Step S204, the threshold obtaining unit 107 calculates the threshold Z(u), referring to the quantization control parameter and the vector number counter u. The definition of the threshold Z(u) is the same as that of the first embodiment.

In Step S205, the value comparing unit 108 compares the power P(u) with the threshold Z(u), when the power P(u) is below the threshold Z(u), this step proceeds to Step S206, while when the power P(u) is the threshold Z(u) and above, this step proceeds to Step S210.

When it proceeds to Step S206, the zero coefficient vector generating unit 109 generates a quantized coefficient vector consisting of all the coefficients of zero and the selection output unit 110 selects the generated zero coefficient vector to supply it as the calculation result of the u-th vector of the quantized coefficient block. Thereafter, it proceeds to Step S207.

In Step S207, the value of the vector number counter u is decreased by 1, and this step proceeds to Step S208. In Step S208, whether the value of the vector number counter u is below a predetermined integer k (0≦k<M) is checked, and when the vector number u is below k, it proceeds to Step S209. When the vector number u is k and above, this step is returned to Step S203, where the quantized coefficient output processing will be repeated on the next signal vector.

In Step S209, whether the value of the vector number counter u is zero and above is checked. When the vector number u is zero and above, it proceeds to Step S210. When the vector number u is a negative value, since all the two-dimensional orthogonal transformation and quantization processing has been completed, a series of processing is stopped and the next input of a pixel block is waited.

In Step S210, the signal vector transmitting unit 103 takes out the u-th signal vector from the block memory 102 and the vertical direction orthogonal transforming unit 104 orthogonally transforms the taken signal vector one-dimensionally at the N-point in a vertical direction. Next, the obtained transform coefficient is quantized by the quantizing unit 105 according to a predetermined quantization characteristic specified by the quantization parameter, and the selection output unit 110 selects its output and supplies it as the calculation result of the u-th vector of the quantized coefficient. Thereafter, it proceeds to Step S211.

In Step S211, the value of the vector number counter u is decreased by 1, and then, the processing from Step S209 will be repeated again. The above is the operation of the second embodiment of the invention.

According to the second embodiment, whether such a sufficient condition that all the coefficients after quantization can become zero is sequentially checked as for (M−k) signal vectors from the k-th vector to the (M−1)-th vector, of M signal vectors of the transform coefficient which has orthogonally transformed an input pixel block in a horizontal direction, starting from the signal vector of the largest vector number. By omitting the vertical direction orthogonal transformation and quantization processing as for a signal vector satisfying the above sufficient condition and simply supplying the quantized coefficient of zero there, the calculation amount required for the vertical direction orthogonal transformation and quantization processing can be reduced on the whole image. Further, by executing the predetermined vertical direction orthogonal transformation and quantization processing on a signal vector of the number smaller than that of the signal vector not satisfying the sufficient condition and the signal vectors from the 0-th vector to the (k−1)-th vector, without checking as above, an increase in the calculation amount caused by unnecessary power calculation can be restrained. As a result, use of the second embodiment of the invention enables the two-dimensional orthogonal transformation and quantization processing at a higher speed and with a lower power consumption.

Although the embodiments of the invention have been described, the invention is not restricted to the above embodiments but various additional modifications are possible. For example, Steps S109, S111, and S112 of the flow chart of FIG. 6 may be omitted, and Step S110 may be executed after Step S108, then returning the control to Step S103 in the case of Yes in Step S110 and completing the processing in the case of No. Namely, the zero detection method may be always adopted to the signals of all the vectors within the block memory 102. Instead of Step S208 of the flow chart of FIG. 7, there may be provided a step of checking whether u is zero and above; returning the control to Step S203 when it is zero and above and completing the processing when it is below zero. Namely, the zero detection method may be continuously used, unless it is judged No in Step S205, regardless of whether the predetermined number of the signal vectors have been processed in the zero detection method.

Alternatively, the processing shown in FIG. 6 and FIG. 7 may be executed by a computer such as a personal computer or a workstation. In this case, a two-dimensional orthogonal transformation/quantization program may be stored in a computer readable storing medium such as a magnetic disk or a semiconductor memory, and the program may be read out by the computer, so to control the operation of the computer, thereby realizing various functional means shown in FIG. 1 on the computer and making the computer perform the processing shown in FIG. 6 or FIG. 7.

As mentioned above, according to the invention, the two-dimensional orthogonal transformation and quantization processing in the still image compact coding and moving image compact coding can be performed at a much higher speed and with a lower power consumption than according to the conventional technique.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method of performing a two-dimensional orthogonal transformation and quantization on an input pixel block, comprising the following step in which with one of a horizontal direction and a vertical direction fixed as a first direction and the other fixed as a second direction, in a process of resolving said two-dimensional orthogonal transformation into one-dimensional orthogonal transformations in said first direction and said second direction, with respect to each signal vector to be orthogonal-transformed in said second direction after having been orthogonal-transformed in said first direction, when a power value obtained by calculating a power of said signal vector is below a predetermined threshold enabling at least one of quantized coefficient signals to take a value other than zero, the second-directional orthogonal transformation and quantization processing as for the corresponding signal vector is omitted and a quantized coefficient signal vector simply consisting of zeros is supplied as a calculation result.

2. A method of performing a two-dimensional orthogonal transformation and quantization on an input pixel block, comprising the following steps of:

with one of a horizontal direction and a vertical direction fixed as a first direction and the other fixed as a second direction, a) applying a one-dimensional orthogonal transform to said input pixel block in said first direction and storing the obtained coefficient signal block into a memory; and b) with respect to at least one of second-directional signal vectors constituting said coefficient signal block stored in said memory, calculating a power of said signal vector as well as calculating a minimum possible power to be taken by any two-dimensional orthogonal transform coefficient, quantized to a value other than zero, in said signal vector through quantization according to a predetermined quantization characteristic, so to compare said both powers; when said former power is below the latter power, generating a quantized coefficient vector consisting of all quantized coefficients of zero, and otherwise, generating a quantized coefficient vector by quantizing said coefficient signal vector obtained through said one-dimensional orthogonal transformation of said corresponding signal vector in said second direction, according to the quantization characteristic.

3. The method of performing the two-dimensional orthogonal transformation and quantization, as set forth in claim 2, further comprising the following step of c) with respect to said signal vector not targeted for said processing in Step b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

4. The method of performing the two-dimensional orthogonal transformation and quantization, as set forth in claim 2, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and said signal vector targeted for said processing in Step b) is one or a plurality of said signal vectors corresponding to transform coefficients whose order in said one-dimensional discrete cosine transformation in said first direction is no less than a predetermined number.

5. A method of performing a two-dimensional orthogonal transformation and quantization on an input pixel block, comprising the following steps of:

with one of a horizontal direction and a vertical direction fixed as a first direction and the other fixed as a second direction, a) applying a one-dimensional orthogonal transform to said input pixel block in said first direction and storing the obtained coefficient signal block into a memory; and b) repeating processing of, with respect to second-directional signal vectors of said coefficient signal block stored in said memory, calculating each power of said signal vectors, starting from said signal vector having the highest possibility, in order of decreasing such a possibility that all coefficients in said signal vector are quantized to zeros, as well as calculating a minimum possible power to be taken by any two-dimensional orthogonal transform coefficient, quantized to a value other than zero, in said signal vector through quantization according to a predetermined quantization characteristic, so to compare said both powers; when said former power is below the latter power, generating a quantized coefficient vector consisting of all the quantized coefficients of zero, and otherwise, generating a quantized coefficient vector by quantizing said coefficient signal vector obtained through said one-dimensional orthogonal transformation of said corresponding signal vector in said second direction, according to the quantization characteristic, until finishing processing of a predetermined number of signal vectors.

6. The method of performing the two-dimensional orthogonal transformation and quantization, as set forth in claim 5, further comprising the following step of:

c) with respect to said signal vector not targeted for said processing in Step b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

7. The method of performing the two-dimensional orthogonal transformation and quantization, as set forth in claim 5, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in Step b), a sequence of decreasing an order of said one-dimensional discrete cosine transformation in said first direction is adopted as the order of decreasing the possibility such that all the quantized coefficients become zero as for said signal vectors.

8. A method of performing a two-dimensional orthogonal transformation and quantization on an input pixel block, comprising the following steps of:

with one of a horizontal direction and a vertical direction fixed as a first direction and the other fixed as a second direction, a) applying a one-dimensional orthogonal transform to said input pixel block in said first direction and storing said obtained coefficient signal block into a memory; and b) repeating processing of, with respect to second-directional signal vectors of said coefficient signal block stored in said memory, calculating each power of said signal vectors, starting from said signal vector having the highest possibility, in order of decreasing such a possibility that all coefficients in said signal vector are quantized to zeros, as well as calculating a minimum possible power to be taken by any two-dimensional orthogonal transform coefficient, quantized to a value other than zero, in said signal vector through quantization according to a predetermined quantization characteristic, so to compare said both powers; when said former power is below the latter power, generating a quantized coefficient vector consisting of all the quantized coefficients of zero, and otherwise, generating a quantized coefficient vector by quantizing said coefficient signal vector obtained through said one-dimensional orthogonal transformation of said corresponding signal vector in said second direction, according to the quantization characteristic, until finishing processing for said first signal vector having the power not below the minimum possible power to be taken by any two-dimensional orthogonal transform coefficient, quantized to a value other than zero, in said signal vector through quantization according to the predetermined quantization characteristic.

9. The method of performing the two-dimensional orthogonal transformation and quantization, as set forth in claim 8, further comprising the following step of
c) with respect to said signal vector not targeted for said processing in Step b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

10. The method of performing the two-dimensional orthogonal transformation and quantization, as set forth in claim 8, in which
said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in Step b), a sequence of decreasing an order of said one-dimensional discrete cosine transformation in said first direction is adopted as the order of decreasing the possibility such that all the quantized coefficients become zero as for said signal vectors.

11. A method of performing a two-dimensional orthogonal transformation and quantization on an input pixel block, comprising the following steps of:
with one of a horizontal direction and a vertical direction fixed as a first direction and the other fixed as a second direction,
a) applying a one-dimensional orthogonal transform to said input pixel block in said first direction and storing said obtained coefficient signal block into a memory; and
b) repeating processing of, with respect to second-directional signal vectors of said coefficient signal block stored in said memory, calculating each power of said signal vectors, starting from said signal vector having the highest possibility, in order of decreasing such a possibility that all coefficients in said signal vector are quantized to zeros, as well as calculating a minimum possible power to be taken by any two-dimensional orthogonal transform coefficient, quantized to a value other than zero, in said signal vector through quantization according to a predetermined quantization characteristic, so to compare said both powers; when the former power is below the latter power, generating a quantized coefficient vector consisting of all the quantized coefficients of zero, and otherwise, generating a quantized coefficient vector by quantizing said coefficient signal vector obtained through said one-dimensional orthogonal transformation of said corresponding signal vector in said second direction, according to the quantization characteristic, until finishing processing for a predetermined number of signal vectors, or if not finishing, until finishing processing for said first signal vector having the power not below the minimum possible power to be taken by any two-dimensional orthogonal transform coefficient, quantized to a value other than zero, in said signal vector through quantization according to the predetermined quantization characteristic.

12. The method of performing the two-dimensional orthogonal transformation and quantization, as set forth in claim 11, further comprising the following step of
c) with respect to said signal vector not targeted for said processing in Step b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

13. The method of performing the two-dimensional orthogonal transformation and quantization, as set forth in claim 11, in which
said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in Step b), a sequence of decreasing an order of said one-dimensional discrete cosine transformation in said first direction is adopted as the order of decreasing the possibility such that all the quantized coefficients become zero as for said signal vectors.

14. A device for performing a two-dimensional orthogonal transformation and quantization on an input pixel block, comprising:
first direction orthogonal transforming means for applying a one-dimensional orthogonal transformation to an input pixel block in a first direction, with one of a horizontal direction and a vertical direction fixed as said first direction and the other fixed as a second direction;
a memory for storing a coefficient signal block supplied by said first direction orthogonal transforming means;
signal vector transmitting means for taking out a second-directional signal vector from said memory;
second direction orthogonal transforming means for one-dimensionally orthogonal-transforming said signal vector transmitted from said signal vector transmitting means, in said second direction;
quantizing means for quantizing a coefficient signal vector that is an output of said second direction orthogonal transforming means, according to a predetermined quantization characteristic;
threshold obtaining means for calculating a minimum possible power to be taken by any two-dimensional orthogonal transform coefficient, quantized to a value other than zero, in said signal vector through quantization according to the quantization characteristic, by said unit of signal vector in said second direction;

power calculating means for calculating the power of said signal vector transmitted from said signal vector transmitting means;

value comparing means for checking whether said calculated power by said power calculating means is below the threshold calculated by said threshold obtaining means;

zero coefficient vector generating means for generating a second directional signal vector consisting of all quantized coefficients of zero;

quantized coefficient selection output means for selecting one of said outputs of said quantizing means and said zero coefficient vector generating means in every second-directional signal vector, as an output coefficient signal after quantization; and controlling means for controlling as follows:

a) with respect to at least one of said second directional signal vectors of said coefficient signal block stored in said memory, said signal vector transmitting means to take out said signal vector, said power calculating means to calculate the power thereof, said threshold calculating means to calculate the threshold power corresponding to said signal vector, said value comparing means to compare said both powers; when said calculated power is below the threshold power, said zero coefficient vector generating means to generate such a quantized coefficient vector that all the quantized coefficients become zero as for said corresponding signal vector, said quantized coefficient vector selection output means to select said zero coefficient vector, while when said calculated power is not below the threshold power, said second direction orthogonal transforming means to apply one-dimensional orthogonal transform to said corresponding signal vector in said second direction, said quantizing means to quantize said obtained coefficient signal vector according to the quantization characteristic, so to generate a quantized coefficient vector, and said quantized coefficient selection output means to select said corresponding quantized coefficient vector.

15. The device for performing the two-dimensional orthogonal transformation and quantization as set forth in claim 14, in which said controlling means further controls as follows:

b) with respect to said signal vector not targeted for said processing, of said second-directional signal vectors of said coefficient signal block stored in said memory, said signal vector transmitting means to take out said signal vector, said second direction orthogonal transforming means to apply one-dimensional orthogonal transform to said signal vector in said second direction, said quantizing means to quantize said obtained coefficient signal vector according to the quantization characteristic, and said quantized coefficient selection output means to select said corresponding coefficient signal vector.

16. The device of performing the two-dimensional orthogonal transformation and quantization, as set forth in claim 14, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and at least one of said second-directional signal vectors of said coefficient signal block stored in said memory is one or a plurality of said signal vectors corresponding to transform coefficients whose order in said one-dimensional discrete cosine transformation in said first direction is no less than a predetermined number.

17. A device for performing a two-dimensional orthogonal transformation and quantization on an input pixel block, comprising:

first direction orthogonal transforming means for applying a one-dimensional orthogonal transformation to said input pixel block in a first direction, with one of a horizontal direction and a vertical direction fixed as said first direction and the other fixed as a second direction;

a memory for storing a coefficient signal block supplied by said first direction orthogonal transforming means;

signal vector transmitting means for taking out a second-directional signal vector from said memory;

second direction orthogonal transforming means for one-dimensionally orthogonal-transforming said signal vector transmitted from said signal vector transmitting means, in said second direction;

quantizing means for quantizing a coefficient signal vector that is an output of said second direction orthogonal transforming means, according to a predetermined quantization characteristic;

threshold obtaining means for calculating a minimum possible power to be taken by any two-dimensional orthogonal transform coefficient, quantized to a value other than zero, in said signal vector through quantization according to the quantization characteristic, by the unit of signal vector in said second direction;

power calculating means for calculating the power of said signal vector transmitted from said signal vector transmitting means;

value comparing means for checking whether said calculated power by said power calculating means is below a threshold calculated by said threshold obtaining means;

zero coefficient vector generating means for generating a second-directional signal vector consisting of all quantized coefficients of zero;

quantized coefficient selection output means for selecting one of the outputs of said quantizing means and said zero coefficient vector generating means in every second-directional signal vector, as an output coefficient signal after quantization; and controlling means for repeating the following processing a of:

a) with respect to said second-directional signal vectors of said coefficient signal block stored in said memory, controlling said signal vector transmitting means to take out each signal vector, starting from said signal vector having the highest possibility, in order of decreasing such a possibility that all the coefficients in said signal vector are quantized to zeros, controlling said power calculating means to calculate the power thereof, controlling said threshold obtaining means to calculate the threshold power corresponding to said signal vector, controlling said value comparing means to compare said both powers; when said calculated power is below the threshold power, controlling said zero coefficient vector generating means to generate such a quantized coefficient vector that all the quantized coefficients become zero as for said corresponding signal vector, controlling said quantized coefficient vector selection output means to select said zero coefficient vector, while when said calculated power is not below the threshold power, controlling said second direction orthogonal transforming means to apply said one dimensional orthogonal transform to said corresponding signal vector in said second direction, controlling said quantizing means to quantize said obtained coefficient signal vector according to the quantization characteristic, so to generate a quantized coefficient vector, and controlling said quantized coefficient selection output means to select said corresponding quantized coefficient vector, until finishing processing of a predetermined number of signal vectors.

18. The device for performing the two-dimensional orthogonal transformation and quantization as set forth in claim 17, in which
said controlling means further controls as follows:
b) with respect to said signal vector not targeted for said processing, of said second-directional signal vectors of said coefficient signal block stored in said memory, said signal vector transmitting means to take out said signal vector, said second direction orthogonal transforming means to apply one-dimensional orthogonal-transform to said signal vector in said second direction, said quantizing means to quantize said obtained coefficient signal vector according to the quantization characteristic, and said quantized coefficient selection output means to select said corresponding coefficient signal vector.

19. The device of performing the two-dimensional orthogonal transformation and quantization, as set forth in claim 17, in which
said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and a sequence of decreasing an order of said one-dimensional discrete cosine transformation in said first direction is adopted as the order of decreasing the possibility such that all the quantized coefficients become zero as for said signal vectors.

20. A device for performing a two-dimensional orthogonal transformation and quantization on an input pixel block, comprising:
first direction orthogonal transforming means for one-dimensionally orthogonal-transforming said input pixel block in a first direction, with one of a horizontal direction and a vertical direction fixed as said first direction and the other fixed as a second direction;
a memory for storing a coefficient signal block supplied by said first direction orthogonal transforming means;
signal vector transmitting means for taking out a second directional signal vector from said memory;
second direction orthogonal transforming means for one-dimensionally orthogonal-transforming said signal vector transmitted from said signal vector transmitting means, in said second direction;
quantizing means for quantizing a coefficient signal vector that is an output of said second direction orthogonal transforming means, according to a predetermined quantization characteristic;
threshold obtaining means for calculating a minimum possible power to be taken by any two-dimensional orthogonal transform coefficient, quantized to a value other than zero, in said signal vector through quantization according to the quantization characteristic, by the unit of signal vector in said second direction;
power calculating means for calculating the power of said signal vector transmitted from said signal vector transmitting means;
value comparing means for checking whether the calculated power by said power calculating means is below a threshold calculated by said threshold obtaining means;
zero coefficient vector generating means for generating a second-directional signal vector consisting of all quantized coefficients of zero;
quantized coefficient selection output means for selecting one of the outputs of said quantizing means and said zero coefficient vector generating means in every second-directional signal vector, as an output coefficient signal after quantization; and
controlling means for repeating the following processing a of:
a) with respect to said second-directional signal vectors of said coefficient signal block stored in said memory, controlling said signal vector transmitting means to take out each signal vector, starting from said signal vector having the highest possibility, in order of decreasing such a possibility that all the coefficients in said signal vector are quantized to zeros, controlling said power calculating means to calculate said power thereof, controlling said threshold obtaining means to calculate said threshold power corresponding to said signal vector, controlling said value comparing means to compare said both powers; when said calculated power is below the threshold power, controlling said zero coefficient vector generating means to generate such a quantized coefficient vector that all the quantized coefficients become zero as for said corresponding signal vector, controlling said quantized coefficient vector selection output means to select said zero coefficient vector, while when said calculated power is not below the threshold power, controlling said second direction orthogonal transforming means to apply said one-dimensional orthogonal transform to said corresponding signal vector in said second direction, controlling said quantizing means to quantize said obtained coefficient signal vector according to the quantization characteristic, so to generate a quantized coefficient vector, and controlling said quantized coefficient selection output means to select said corresponding quantized coefficient vector, until finishing processing for said first signal vector having the power not below the minimum possible power to be taken by any two-dimensional orthogonal transform coefficients, quantized to a value other than zero, in said signal vector through quantization according to the predetermined quantization characteristic.

21. The device for performing the two-dimensional orthogonal transformation and quantization as set forth in claim 20, in which
said controlling means further controls as follows:
b) with respect to said signal vector not targeted for said processing, of said second-directional signal vectors of said coefficient signal block stored in said memory, said signal vector transmitting means to take out said signal vector, said second direction orthogonal transforming means to apply said one-dimensional orthogonal transform to said signal vector in said second direction, said quantizing means to quantize said obtained coefficient signal vector according to the quantization characteristic, and the quantized coefficient selection output means to select said corresponding coefficient signal vector.

22. The device of performing the two-dimensional orthogonal transformation and quantization, as set forth in claim 20, in which
said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and a sequence of decreasing an order of said one-dimensional discrete cosine transformation in said first direction is adopted as the order of decreasing the possibility such that all the quantized coefficients become zero as for said signal vectors.

23. A device for performing a two-dimensional orthogonal transformation and quantization on an input pixel block, comprising:
first direction orthogonal transforming means for one-dimensionally orthogonal-transforming said input pixel block in a first direction, with one of a horizontal direction and a vertical direction fixed as said first direction and the other fixed as a second direction;
a memory for storing a coefficient signal block supplied by said first direction orthogonal transforming means;
signal vector transmitting means for taking out a second-directional signal vector from said memory;
second direction orthogonal transforming means for one-dimensionally orthogonal-transforming said signal vector transmitted from said signal vector transmitting means, in said second direction;
quantizing means for quantizing a coefficient signal vector that is an output of said second direction orthogonal transforming means, according to a predetermined quantization characteristic;
threshold obtaining means for calculating a minimum possible power to be taken by any two-dimensional orthogonal transform coefficient, quantized to a value other than zero, in said signal vector through quantization according to the quantization characteristic, by the unit of signal vector in said second direction;
power calculating means for calculating the power of said signal vector transmitted from said signal vector transmitting means;
value comparing means for checking whether the calculated power by said power calculating means is below a threshold calculated by said threshold obtaining means;
zero coefficient vector generating means for generating a second-directional signal vector consisting of all quantized coefficients of zero;
quantized coefficient selection output means for selecting one of the outputs of said quantizing means and said zero coefficient vector generating means in every second-directional signal vector, as an output coefficient signal after quantization; and
controlling means for repeating the following processing a of:
a) with respect to said second directional signal vectors of said coefficient signal block stored in said memory, controlling said signal vector transmitting means to take out each signal vector, starting from said signal vector having the highest possibility, in order of decreasing such a possibility that all the coefficients in said signal vector are quantized to zeros, controlling the power calculating means to calculate the power thereof, controlling said threshold obtaining means to calculate the threshold power corresponding to said signal vector, controlling the value comparing means to compare said both powers; when the calculated power is below the threshold power, controlling the zero coefficient vector generating means to generate such a quantized coefficient vector that all the quantized coefficients become zero as for said corresponding signal vector, controlling said quantized coefficient vector selection output means to select said zero coefficient vector, while when said calculated power is not below the threshold power, controlling said second direction orthogonal transforming means to apply said one-dimensional orthogonal transform to said corresponding signal vector in said second direction, controlling said quantizing means to quantize said obtained coefficient signal vector according to the quantization characteristic, so to generate a quantized coefficient vector, and controlling the quantized coefficient selection output means to select the corresponding quantized coefficient vector, until finishing processing for a predetermined number of signal vectors, or if not finishing, until finishing processing for said first signal vector having the power not below the minimum possible power to be taken by any two-dimensional orthogonal transform coefficient, quantized to a value other than zero, in said signal vector through quantization according to the predetermined quantization characteristic.

24. The device for performing the two-dimensional orthogonal transformation and quantization as set forth in claim 23, in which
said controlling means further controls as follows:
b) with respect to said signal vector not targeted for said processing, of said second-directional signal vectors of said coefficient signal block stored in said memory, said signal vector transmitting means to take out said signal vector, said second direction orthogonal transforming means to apply the one-dimensional orthogonal transform to said signal vector in said second direction, said quantizing means to quantize the obtained coefficient signal vector according to the quantization characteristic, and the quantized coefficient selection output means to select said corresponding coefficient signal vector.

25. The device of performing the two-dimensional orthogonal transformation and quantization, as set forth in claim 23, in which
said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and a sequence of decreasing an order of said one-dimensional discrete cosine transformation in said first direction is adopted as the order of decreasing the possibility such that all the quantized coefficients become zero as for said signal vectors.

26. A program on a computer-readable storage medium for making a computer perform a two-dimensional orthogonal transformation and quantization on an input pixel block, in which the computer performs the following functions of:

with one of a horizontal direction and a vertical direction fixed as a first direction and the other fixed as a second direction, a) applying a one-dimensional orthogonal transform to said input pixel block in said first direction and storing said obtained coefficient signal block into a memory;

b) with respect to at least one of second-directional signal vectors constituting said coefficient signal block stored in said memory, calculating a power of said signal vector as well as calculating a minimum possible power to be taken by any two-dimensional orthogonal transform coefficient, quantized to a value other than zero, in said signal string through quantization according to a predetermined quantization characteristic, so to compare said both powers; when the former power is below the latter power, generating a quantized coefficient vector consisting of all quantized coefficients of zero, and otherwise, generating a quantized coefficient vector by quantizing said coefficient signal vector obtained through said one-dimensional orthogonal transformation of said corresponding signal vector in said second direction, according to the quantization characteristic; and c) with respect to said signal vector not targeted for said processing in said function b), of said second-directional signal vectors of said coefficient signal block stored in said memory, generating a quantized coefficient vector by quantizing said coefficient signal vector obtained through said one-dimensional orthogonal transformation of said signal €in said second direction, according to the quantization characteristic.

27. The program on a computer-readable storage medium for making a computer perform the two-dimensional orthogonal transformation and quantization, as set forth in claim 26, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and said signal vector targeted for said processing in the function b) is one or a plurality of said signal vectors corresponding to transform coefficients whose order in one-dimensional discrete cosine transformation in said first direction is no less than a predetermined number.

28. A program on a computer-readable storage medium for making a computer perform a two-dimensional orthogonal transformation and quantization on an input pixel block, in which the computer performs the following functions of:

with one of a horizontal direction and a vertical direction fixed as a first direction and the other fixed as a second direction, a) applying a one-dimensional orthogonal transform to said input pixel block in said first direction and storing the obtained coefficient signal block into a memory;

b) repeating processing of, with respect to second-directional signal vectors of the coefficient signal block stored in said memory, calculating each power of said signal vectors, starting from said signal vector having the highest possibility, in order of decreasing such a possibility that all coefficients in said signal vector are quantized to zero, as well as calculating a minimum possible power to be taken by any two-dimensional orthogonal transform coefficient, quantized to a value other than zero, in said signal vector through quantization according to a predetermined quantization characteristic, so to compare said both powers; when the former power is below the latter power, generating a quantized coefficient vector consisting of all the quantized coefficients of zero, and otherwise, generating a quantized coefficient string vector by quantizing said coefficient signal vector obtained through said one-dimensional orthogonal transformation of said corresponding signal vector in said second direction, according to the quantization characteristic, until finishing processing for a predetermined number of signal vectors; and c) with respect to said signal vector not targeted for said processing in the function b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

29. The program on a computer-readable storage medium for making a computer perform the two-dimensional orthogonal transformation and quantization, as set forth in claim 28, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in the function b), a sequence of decreasing an order of said one-dimensional discrete cosine transformation in said first direction is adopted as the order of decreasing the possibility such that all the quantized coefficients become zero as for said signal vectors.

30. A program on a computer-readable storage medium for making a computer perform a two-dimensional orthogonal transformation and quantization on an input pixel block, in which the computer performs the following functions of:

with one of a horizontal direction and a vertical direction fixed as a first direction and the other fixed as a second direction, a) applying a one-dimensional orthogonal transform to said input pixel block in said first direction and storing the obtained coefficient signal block into a memory;

b) repeating processing of, with respect to second directional signal vectors of said coefficient signal block stored in said memory, calculating each power of said signal vectors, starting from said signal vector having the highest possibility, in order of decreasing such a possibility that all coefficients in said signal vector are quantized to zeros, as well as calculating a minimum possible power to be taken by any two-dimensional orthogonal transform coefficient, quantized to a value other than zero, in said signal vector through quantization according to a predetermined quantization characteristic, so to compare said both powers; when the former power is below the latter power, generating a quantized coefficient vector consisting of all the quantized coefficients of zero, and otherwise, generating a quantized coefficient vector by quantizing said coefficient signal vector obtained through said one-dimensional orthogonal transformation of said corresponding signal vector in said second direction, according to the quantization characteristic, until finishing processing for said first signal vector having the power not below the minimum possible power to be taken by any two-dimensional orthogonal transform coefficient, quantized to a value other than zero, in said signal vector through quantization according to the predetermined quantization characteristic; and c) with respect to said signal vector not targeted for the processing in the function b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

31. The program on a computer-readable storage medium for making a computer perform the two-dimensional orthogonal transformation and quantization, as set forth in claim 30, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in the function b), a sequence of decreasing an order of said one-dimensional discrete cosine transformation in said first direction is adopted as the order of decreasing the possibility such that all the quantized coefficients become zero as for said signal vectors.

32. A program on a computer-readable storage medium for making a computer perform a two-dimensional orthogonal transformation and quantization on an input pixel block, in which the computer performs the following functions of:

with one of a horizontal direction and a vertical direction fixed as a first direction and the other fixed as a second direction, a) applying a one-dimensional orthogonal transform to said input pixel block in said first direction and storing said obtained coefficient signal block into a memory;

b) repeating processing of, with respect to second-directional signal vectors of said coefficient signal block stored in said memory, calculating each power of said signal vectors, starting from said signal vector having the highest possibility, in order of decreasing such a possibility that all coefficients in said signal vector are quantized to zeros, as well as calculating a minimum possible power to be taken by any two-dimensional orthogonal transform coefficient, quantized to a value other than zero, in said signal vector through quantization according to a predetermined quantization characteristic, so to compare said both powers; when the former power is below the latter power, generating a quantized coefficient vector consisting of all the quantized coefficients of zero, and otherwise, generating a quantized coefficient vector by quantizing said coefficient signal vector obtained through said one-dimensional orthogonal transformation of said corresponding signal vector in said second direction, according to the quantization characteristic, until finishing processing for a predetermined number of signal vectors, or if not finishing, until finishing processing for said first signal vector having the power not below the minimum possible power to be taken by any two-dimensional orthogonal transform coefficient, in said signal vector quantized to a value other than zero, through quantization according to the predetermined quantization characteristic; and c) with respect to said signal vector not targeted for said processing in the function b), of said second-directional signal vectors of said coefficient signal block stored in said memory, generating a quantized coefficient vector by quantizing said coefficient signal vector obtained through said one-dimensional orthogonal transformation of said signal vector in said second direction, according to the quantization characteristic.

33. The program on a computer-readable storage medium for making a computer perform the two-dimensional orthogonal transformation and quantization, as set forth in claim 32, in which said two-dimensional orthogonal transformation is a two-dimensional discrete cosine transformation, said one-dimensional orthogonal transformation in said first direction is a one-dimensional discrete cosine transformation in said first direction, said one-dimensional orthogonal transformation in said second direction is a one-dimensional discrete cosine transformation in said second direction, and in the function b), a sequence of decreasing an order of said one-dimensional discrete cosine transformation in said first direction is adopted as the order of decreasing the possibility such that all the quantized coefficients become zero as for said signal vectors.

34. A method of performing a two-dimensional orthogonal transformation and quantization on an input pixel block, comprising the following step in which with one of a horizontal direction and a vertical direction fixed as a first direction and the other fixed as a second direction, in a process of resolving said two-dimensional orthogonal transformation into one-dimensional orthogonal transformations in said first direction and said second direction, with respect to each signal vector to be orthogonal-transformed in said second direction after having been orthogonal-transformed in said first direction, when a power value obtained by analyzing said signal vector is below a predetermined threshold, the second-directional orthogonal transformation and quantization processing as for the corresponding signal vector is omitted and a quantized coefficient signal vector simply consisting of zeros is supplied as a calculation result.

35. A device for performing a two-dimensional orthogonal transformation and quantization to an input pixel block, comprising:

first direction orthogonal transforming means for applying a one-dimensional orthogonal transformation to an input pixel block in a first direction, with one of a horizontal direction and vertical direction fixed as said first direction and the other fixed as a second direction;

second direction orthogonal transforming means for one-dimensionally orthogonal-transforming the output of said first direction orthogonal transforming means;

quantizing means for quantizing a coefficient signal vector that is the output of said second direction orthogonal transforming means;

power calculating means for analyzing a second-direction signal vector extracted from the output block of said first direction orthogonal transforming means;

deciding means for deciding either to omit a second-direction orthogonal transformation and a quantization by said second direction orthogonal transforming means and said quantizing means or not, based on the power value calculated by said power calculating means;

zero coefficient vector generating means for generating a second-direction signal vector consisting of all quantized coefficients of zero; and quantized coefficient selection output means for selecting one of said outputs of said quantizing means and said zero coefficient vector generating means in every second directional signal string, as an output coefficient signal after quantization.

36. The device for performing the two-dimensional orthogonal transformation and quantization as set forth in claim 35, in which said deciding means decides to omit the second-direction transformation and quantization for a signal vector whose power is below a threshold.

* * * * *